United States Patent
Tomczyk et al.

(10) Patent No.: US 8,693,101 B2
(45) Date of Patent: Apr. 8, 2014

(54) LENS SHEET HAVING LENS ARRAY FORMED IN PRE-SELECTED AREAS AND ARTICLES FORMED THEREFROM

(75) Inventors: John Tomczyk, Shoreview, MN (US); Jonathan Van Loon, Hastings, MN (US); David E. Corey, Redlands, CA (US)

(73) Assignee: Travel Tags, Inc., North Mankato, MN (US)

( * ) Notice: Subject to any disclaimer, the term of this patent is extended or adjusted under 35 U.S.C. 154(b) by 0 days.

(21) Appl. No.: 13/229,116

(22) Filed: Sep. 9, 2011

(65) Prior Publication Data

US 2012/0140333 A1    Jun. 7, 2012

Related U.S. Application Data

(60) Provisional application No. 61/420,571, filed on Dec. 7, 2010, provisional application No. 61/438,536, filed on Feb. 1, 2011, provisional application No. 61/480,845, filed on Apr. 29, 2011.

(51) Int. Cl.
| | |
|---|---|
| *G02B 27/10* | (2006.01) |
| *G02B 3/00* | (2006.01) |
| *G02B 27/14* | (2006.01) |
| *G02B 27/09* | (2006.01) |

(52) U.S. Cl.
CPC ............ *G02B 3/0056* (2013.01); *G02B 27/145* (2013.01); *G02B 27/0961* (2013.01)
USPC ............ 359/619; 359/618; 359/621; 359/623

(58) Field of Classification Search
CPC . G02B 27/145; G02B 3/0056; G02B 27/0961
USPC .................................................. 359/618–630
See application file for complete search history.

(56) References Cited

U.S. PATENT DOCUMENTS

| 5,171,510 | A  | 12/1992 | Barquet et al. |
| 6,369,949 | B1 | 4/2002  | Conley |

(Continued)

FOREIGN PATENT DOCUMENTS

| EP | 0346210 A1 | 12/1989 |
| EP | 1607272 A1 | 12/2005 |

(Continued)

OTHER PUBLICATIONS

PCT Search Report dated Nov. 16, 2011 for PCT Application No. PCT/US2011/050978 filed Sep. 9, 2011, 4 pages.

(Continued)

*Primary Examiner* — Scott J Sugarman
*Assistant Examiner* — Daniele Manikeu
(74) *Attorney, Agent, or Firm* — Patterson Thuente Pedersen, P.A.

(57) ABSTRACT

A lens sheet having one or more lens arrays positioned in selected discrete areas. Each lens array includes a plurality of lenses, each having a width, a height, and a lens peak. The lens array is set below the planar surface of the lens sheet, such that lens array does not extend above the lens sheet. Furthermore, the lens array is completely bordered by or contained within planar portions of the lens sheet. One or more dimensional images are printed below each of the lens arrays, and/or one or more static images can be printed on the planar portions of the lens sheet.

7 Claims, 16 Drawing Sheets

(56) References Cited

U.S. PATENT DOCUMENTS

| | | |
|---|---|---|
| 6,424,467 B1 | 7/2002 | Goggins |
| 6,490,092 B1 | 12/2002 | Goggins |
| 6,749,925 B2 | 6/2004 | Hoppe et al. |
| 6,900,944 B2 | 5/2005 | Tomczyk |
| 6,995,914 B1 | 2/2006 | Conley et al. |
| 7,002,748 B1 | 2/2006 | Conley et al. |
| 7,359,120 B1 | 4/2008 | Raymond et al. |
| 7,609,450 B2 | 10/2009 | Niemuth |
| 7,757,538 B2 | 7/2010 | Mitterhofer et al. |
| 2001/0002154 A1* | 5/2001 | Ohuchi et al. ............... 359/621 |
| 2005/0128596 A1* | 6/2005 | Li et al. ..................... 359/619 |
| 2008/0030864 A1* | 2/2008 | Gougeon et al. ............ 359/619 |
| 2008/0088126 A1 | 4/2008 | Hoffman et al. |
| 2008/0088931 A1 | 4/2008 | Hoffman |
| 2008/0213528 A1 | 9/2008 | Hoffman |
| 2008/0257671 A1 | 10/2008 | Jacob et al. |
| 2009/0231715 A1* | 9/2009 | Hiroya et al. ............... 359/619 |
| 2009/0231717 A1* | 9/2009 | Mizutani et al. ............. 359/620 |
| 2009/0315321 A1 | 12/2009 | Michieli et al. |
| 2010/0086753 A1 | 4/2010 | Johnson et al. |
| 2010/0134895 A1 | 6/2010 | Hoffman et al. |
| 2010/0214661 A1* | 8/2010 | Spiro ......................... 359/619 |

FOREIGN PATENT DOCUMENTS

| | | |
|---|---|---|
| EP | 1629994 A2 | 3/2006 |
| WO | WO 96/15912 | 5/1996 |

OTHER PUBLICATIONS

PCT Written Opinion dated Nov. 16, 2011 for PCT Application No. PCT/US2011/050978 filed Sep. 9, 2011, 7 pages.
HP Original Toner printout, obtained Nov. 16, 2010, 1 page.
Fresno Lens printout, obtained Dec. 11, 2010, 1 page.
Unknown Lens sheet printout, known to applicant at least as of May 12, 2011, 1 page.

* cited by examiner

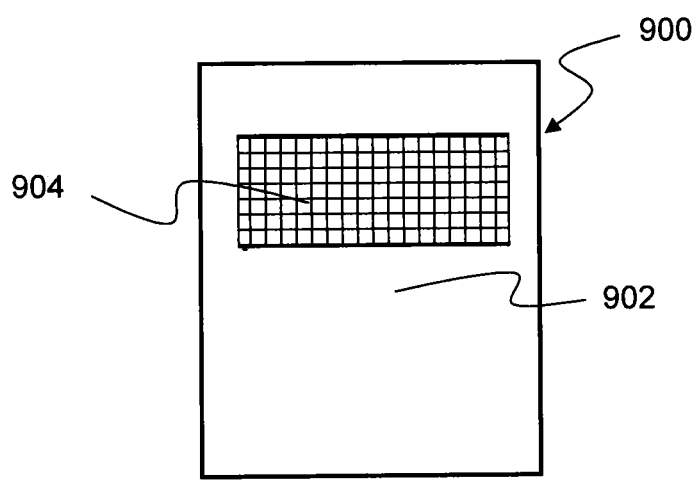
FIG. 9
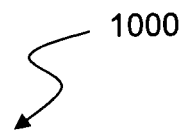

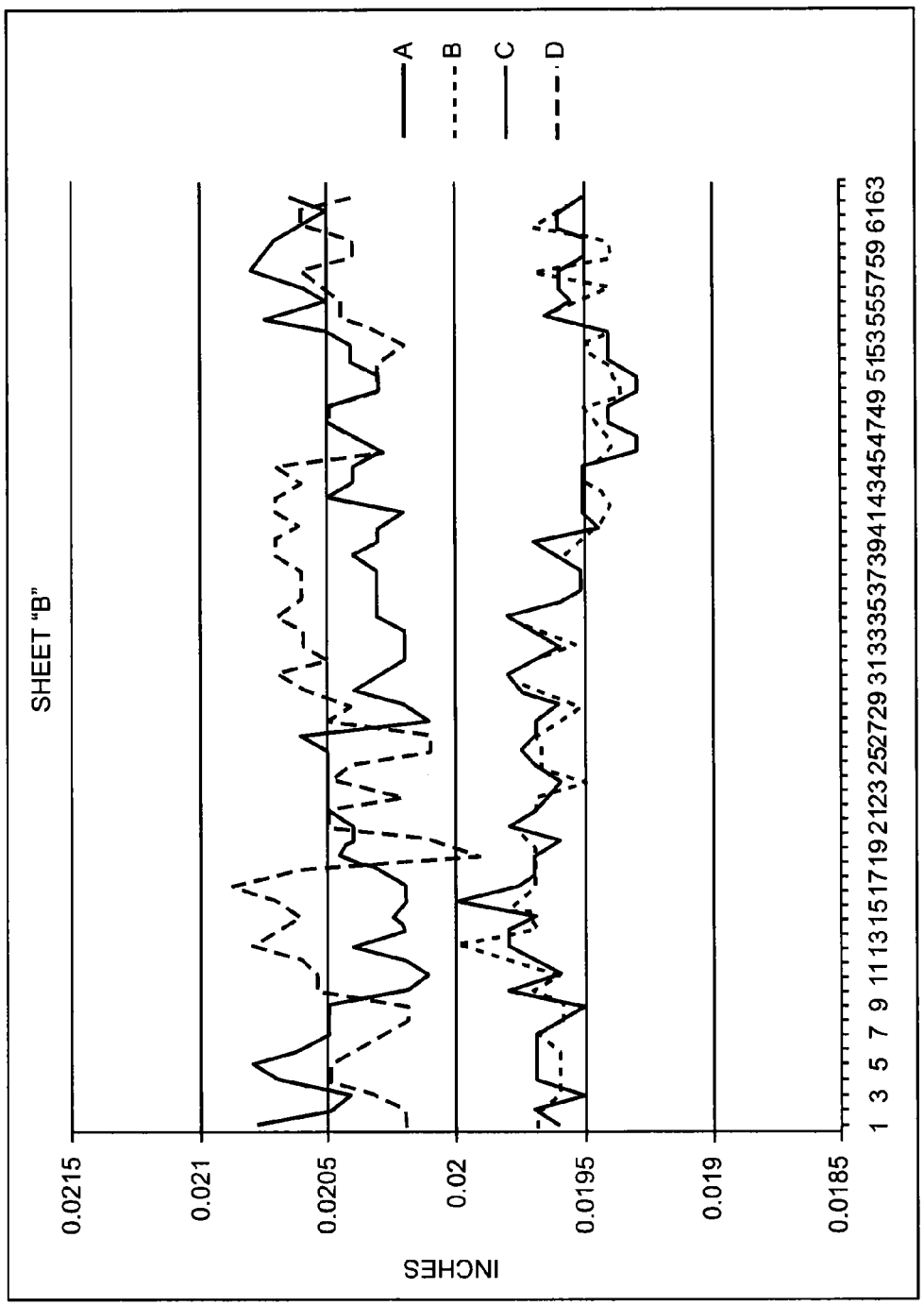

LENS SHEET HAVING LENS ARRAY FORMED IN PRE-SELECTED AREAS AND ARTICLES FORMED THEREFROM

RELATED APPLICATIONS

The present application claims the benefit of U.S. Provisional Application No. 61/420,571 filed Dec. 7, 2010, U.S. Provisional Application No. 61/438,536 filed Feb. 1, 2011, and U.S. Provisional Application No. 61/480,845 filed Apr. 29, 2011, each of which is incorporated herein in its entirety by reference.

FIELD OF THE INVENTION

The invention relates generally to dimensional image display sheets including a plastic film having an array of lenses in one or more preselected areas of the film and an optional image(s) to be displayed on and/or through the array. More particularly, the invention relates to image display sheets having a planar portion and a lens array positioned flush with or below the planar portion, and an optional printed image(s) that is viewable on and/or through the lens array.

BACKGROUND OF THE INVENTION

It is often desirable to impart visual effects such as three dimensionality or motion characteristics upon articles of consumable products and the like. Dimensional image display devices or sheets are used to create these desirable visual effects such as, for example, 3D effects, magnification, animation, depth, morphing, flipping, hidden codes or messages, and other such types of graphics. The dimensional image display sheets can be applied to or used as various articles as eye-catching promotional tools, advertising, branding, games, and the like. Examples of articles can include, for example, sports cards, game cards, containers, cups, cup inserts, wraps, and sleeves, packaging materials such as packaging boxes, wrappers, tubes such as toothpaste tubes, envelopes, greeting cards, invitations, napkins, posters, business cards, fabrics and clothing, billboards, stickers, labels, badges, pens, magnets, postcards, identification or stored value cards, such as gift cards, credit cards, rewards cards, wall paper, folders such as pocket folders, media packaging such as DVD or CD covers, and any of a variety of articles.

Dimensional image display devices typically incorporate a printed image proximate a lens sheet having a lens array thereon. The printed image can be either directly bonded or printed to the lens array, or printed on a separate substrate and laminated to the lens array. Image segments or elements are printed using high resolution, and precise registration techniques to form the overall image. One such printing technique includes interlacing images, in which a composite of two or more images are interlaced with each other in individual slices or segments to form the overall image that will be viewed through a lens array. The interlaced image is then configured or mapped so that each lens of the array focuses on at least a portion of the interlaced image. The interlaced image is configured to accommodate both viewing distance and curvature through the lens.

One type of dimensional imaging technology well-known in the art includes lenticular image technology. Lenticular image technology includes a lenticular image, such as an interlaced image, in combination with a lenticular lens array. The lenticular lens array is formed from a web or sheet including a plurality of substantially parallel elongated cylindrical lenticules or lenses extending from one surface. The second surface is planar. Typically, the lenticular lens array is formed from a plastic material and can be formed from any of a variety of techniques including casting, coating, embossing, extruding, and the like. The interlaced image can be printed directly on the planar second surface, or can be printed on a separate substrate and subsequently laminated to the lenticular lens array by a clear adhesive, fusing, compression lamination, or other similar techniques. Examples of lenticular image technology can be found in U.S. Pat. No. 6,900,944 to Tomczyk; U.S. Pat. No. 6,424,467 to Goggins; and U.S. Pat. No. 7,359,120 to Raymond et al., the disclosures of which are incorporated herein by reference.

Currently available methods can provide a lens sheet or lenticulated sheet array, which can vary in thickness or caliper, for example, from about 10 mils to about 40 mils. The thickness of the extruded lenticular lens layer is suggested by the formula: $r=C\times f$ or $r=[(n'-n)/n']\times f$ where r is the radius of curvature of a lenticular lens, C is a constant, f is the focal length of optimal focus thickness for the plastic, n' is the index of refraction of the lens construction material, such as an extruded plastic, and n is index of refraction of air. From the formula it is evident that the thicker the plastic, the lower the pitch or lenticules per inch (LPI), and the lower the pitch, the coarser the lens. A coarse lens can give undesirable lens effects, for example, distortion of an underlying image. A coarser lens requires image graphics and text to be significantly large to avoid undesirable lens effects. When printing a lenticular image on a lenticular lens, the lens needs to be parallel to the interlaced image, such as, for example within $+/-\frac{1}{2}$ lenticule per ten inches. If this is not maintained, the image does not have an acceptable vertical flip, but rather a skewed flip. Skew can be defined as unacceptable ink-to-lens registration accuracy of the printed vertical lenticular image elements to the vertical lenticular lenses.

Another type of dimensional imaging technology includes fly's eye or bug's eye image technology. Fly's eye or "integral" lens arrays are formed from a web or sheet including a plurality of domes or semi-circular structures extending from the surface, rather than the elongated lenses of lenticular technology. Similar to lenticular, an image, such as an interlaced image, can be printed on the planar side of the lens sheet or web, or printed on a separate substrate and laminated thereto. There are a number of benefits to using a fly's eye lens as opposed to a lenticular lens. The fly's eye lens is essentially a lenticular lens in multiple directions tangentially around the lens. This essentially allows one not only to interlace an image from left to right (horizontal direction), but also up and down (vertical direction), diagonally, or in any combination to give additional animated effects.

Current methods of producing dimensional images, such as lenticular images, include printing of lenticular sheets through a sheet-fed or web-fed press where, as discussed above, the caliper ranges from about 10 mils to about 40 mils. Alternatively, the caliper of the lens sheets or webs can be from 10 mils or less, thereby forming thin film display devices. Examples of thin film technologies are described in U.S. Pat. No. 6,424,467 to Goggins, U.S. Pat. No. 7,359,120 to Raymond et al., and U.S. Patent Application Publication No. 2010/0134895, entitled "Thin Film High Definition Dimensional Image Display Device and Methods of Making Same," all of which are incorporated herein by reference in their entireties. Novel imaging or printing techniques, known commercially as Infinidepth®, do not require the critical ink-to-ink registration of traditional interlacing and therefore can be used on thinner lenses with higher lens densities, as described in one or more of U.S. Patent Application Publication Nos. U.S. Application Publication Nos. 2008/0088126 entitled "Layered Image Display Applications and Methods," 2008/0088931 entitled "Layered Image Display Sheet," and 2008/0213528 entitled "Customized Printing with Depth Effect" all of which are incorporated herein by reference in their entireties.

Whether in thin film format or thicker rigid format, it can be desirable to impart visual effects such as three dimensionality or motion characteristics on only select areas of a surface or article, as opposed to an entire surface, typically referred to as "spot" lenticular. One such method of spot lenticular is described in U.S. Pat. No. 7,002,748 to Conley et al. Another technique includes a varied lenticular lens array, in which the density and/or shape of the lenticules are altered on a single surface is described in U.S. Pat. No. 7,609,450 to Niemuth.

However, in each of these examples, the lenses extend above the base or planar surface making it difficult to print either a first surface around the lenticular features, or the second opposite planar surface after the array has been formed because the varying caliper and uneven surface makes it difficult or impossible to maintain constant pressure through a contact-based printing press, such as in offset printing, resulting in poor print quality and/or distorted lenses. For example, when a web or sheet of varying caliper is printed via an offset flexographic or lithographic printing process, the variance in caliper between the planar and lenticulated areas causes uneven pressure in the nip formed by the impression cylinder and the blanket or offset cylinder, thereby resulting in variations in color densities. A variance as little as two or more mil can result in poor quality printing. If the pressure is increased to maintain even pressure over the sheet, the lenses or lenticules are forced at high pressure either into the blanket cylinder or the impression cylinder, depending on what surface is being printed, which can result in distortion of the lenses and permanent damage to the blanket.

Further, if a lens sheet having a lens array in which the lenses extend above the planar surface is married or bonded to a substrate, such as a printed substrate, the uneven caliper or surface can cause difficulty in a nipping process (nip pressure or bonding pressure) used to mount the sheets together. Similar to the problems associated with contact-based printing, the lenses or lenticules are forced at high pressure into nip rollers, which can result in distortion of the individual lenses or caliper variation or bubbling.

When printing a number of sheets, it is common to use equipment that automatically feeds each sheet into the printing press from a stack. In both contact and contactless printing such as inkjet and other digital printing techniques, a variance in caliper of the sheet can result in poor or inconsistent autofeeding capabilities because the equipment may misjudge the location of the next sheet from the stack, either grabbing no sheet or more than one sheet due to pile curl or waviness. Similar to sheet-fed processes, caliper variance in web rolls (sometimes called gauge banding) can cause inconsistent web gauging which in turn can cause problems with unwind and/or rewind processes, as well as calibration of one or more systems in the webline, such as the uneven printing pressure described above. Furthermore, caliper variance can cause similar issues, whether in sheet or web form, in cutting processes, and/or stacking off-press. For example, in a contact-based cutting process, such as a guillotine or die-cutting process, caliper variance can cause misjudgment of the depth of cut needed, resulting in too shallow of a cut such that the web or sheet is not completely cut through, or the cut is too deep which can cause damage to the die, or even result in the die rule being buried in a cutting surface. In addition, caliper variations in the diecutter could cause infeed and stripping operation problems.

Therefore, there remains a need for a lens sheet having one or more lens arrays in select areas that can be economically and efficiently produced and printed for use with any of a variety of articles for offering special visual effects such as three-dimensionality, magnification, and/or animation, and that can be delivered in a flat format, such as a flat stack or roll.

SUMMARY OF THE INVENTION

According to embodiments of the invention, a lens sheet having lens array in one or more preselected areas generally includes a substrate having a first surface and a second generally planar surface. For clarity purposes, "lens sheet" can refer to either a sheet or web format. Furthermore, "lens sheet" can refer to a single piece, or a sheet containing multiple pieces to be converted or produced therefrom. The first surface includes one or more generally planar portions, and one or more lens array areas, wherein the peaks of the lenses in each of the lens array areas are in the same plane or below the plane formed by the generally planar portions to thereby decrease the overall thickness of the lens sheet, and to provide a sheet having generally uniform caliper, i.e. one that is in a flat format such that it can be stacked in a flat stack or roll, and presents generally flat surfaces to a printing process with no lenses extending above the planar surface such that even pressure can be maintained during printing.

The lens sheet can be formed of a transparent or translucent material, and optionally include a printed image layer on the second generally planar surface or second substrate (e.g. backing sheet) that optionally is at least partly "viewable" such that the image layer is recognizable, human- or machine-readable, decoded, and/or legible, through the one or more lens array areas, resulting in a visual effect including three-dimensionality, motion or animation, depth effects, magnification, and/or combinations thereof. Additional static or flat printed images can be formed on the second surface or second substrate and are viewable through the one or more generally planar portions of the first surface. Additionally or alternatively, one or more static or flat printed images can be formed on the one or more generally planar portions of the first surface.

Methods of making a lens sheet having one or more lens arrays in preselected areas include forming one or more lens arrays in an area of the first surface of a polymeric sheet or material by extrusion, embossing, injection molding, or any of a variety of patterning techniques. In one embodiment, a plastic material is extruded or supplied to a patterned cylinder or plate having a relief of the desired lens array pattern(s), such that the lens array(s) are formed in the plastic material. The remaining portions of the first surface include one or more planar portions. Each lens array comprises a plurality of lenses, and the peaks of the lenses do not extend above the one or more planar portions. Optionally, one or more of the lens array(s) is entirely bordered by at least one planar portion.

The lens sheet can be used in a variety of applications including thin film or thicker, rigid film applications. Some applications can include, but are not limited to, thin film packaging, the card industry including identification, transaction, gift, greeting, and game cards, currency, security features, packaging such as box packaging, advertising and marketing such as promotional items, posters, and the like, or any of a variety of contemplated uses in which special visual effects are desired.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 9 is a front view of a piece with an integral square fly's eye lens array according to an embodiment of the invention.

FIG. 18A is a graph of caliper measurements of Sheet B of the Example at locations A-D.

Figure 1:
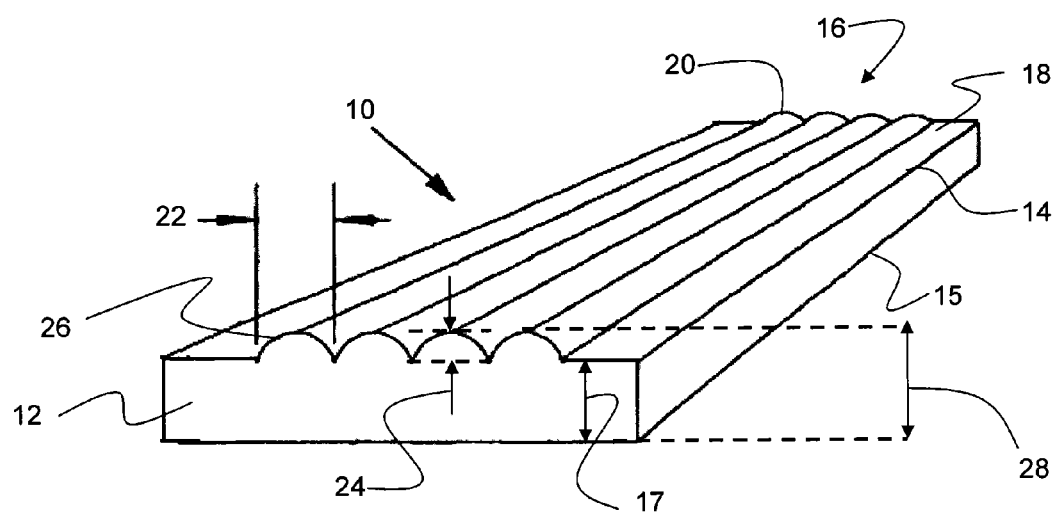
FIG. 1 is a perspective view of a portion of a lenticular array according to the prior art.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE DRAWINGS

Referring to FIG. 1, a spot lenticular lens sheet 10 according to the prior art includes a transparent sheet 12 having a first surface 14 and a second surface 15 separated by a sheet thickness 17. First surface 14 includes a lens array 16 and planar portions 18. Lens array 16 is made up of a plurality of lenticular lenses 20, i.e. elongated convex light steering devices. Each lens 20 has a width 22, and a lens height 24 measured from first surface 14 to a peak 26. As shown, lenses 20 extend above or beyond a plane formed by first surface 14. Therefore, an overall thickness 28 of lens sheet 10 includes sheet thickness 17 and lens height 24.

Figure 2:
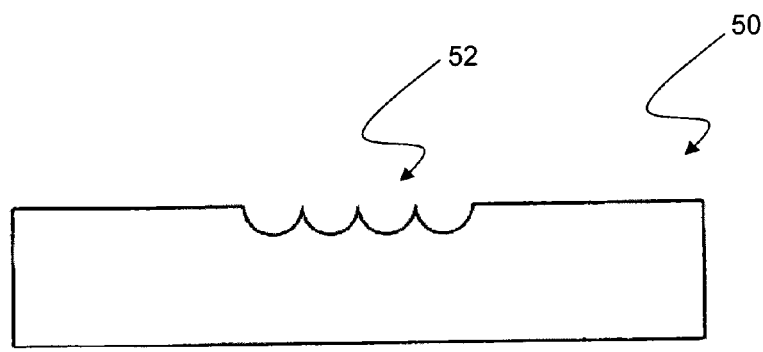
FIG. 2 is a cross-sectional view of an engraved lenticular pattern according to the prior art.

Referring to FIG. 2, the prior art lenticular lens sheet 10 can be formed by extrusion, embossing, or casting using an engraved cylinder or plate 50, having a lens pattern 52 defined thereon. Lens pattern 52 is the sunken relief of lens array 16 of FIG. 1. As depicted, lens pattern 52 is sunken from the plane of the cylinder or plate, thereby forming raised lenses on first surface 14.

Figure 3A:
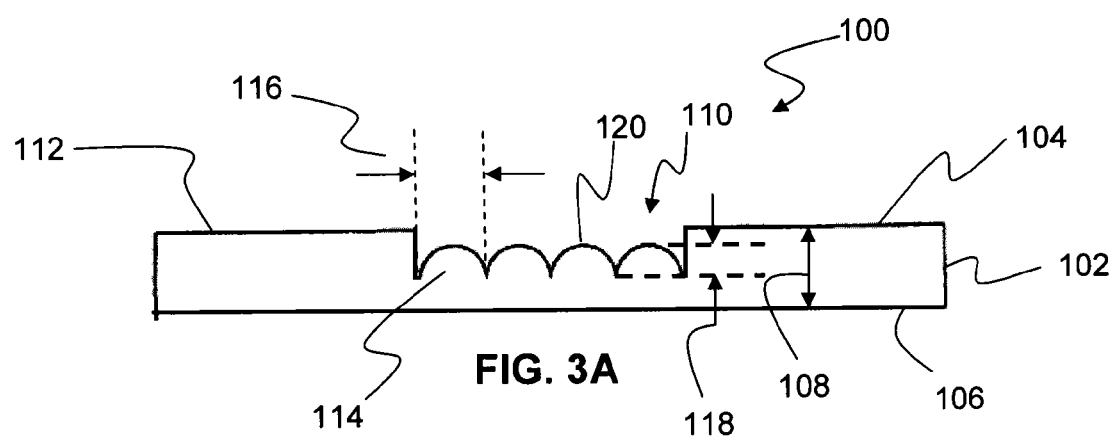
FIG. 3A is a cross-sectional view of a portion of a lens sheet with a lens array according to an embodiment of the present invention.

Referring to FIG. 3a, a spot lens sheet 100 according to embodiments of the present invention generally includes a sheet 102 having a first surface 104 and a second surface 106 separated by a sheet thickness 108. Sheet 102 can be formed from one or more plastic materials such as, for example, polyester, polycarbonate (PC), polyvinyl chloride (PVC), polyethylene terephthalate (PET), amorphous polyethylene terephthalate (APET), glycol-modified polyethylene terephthalate (PETG), polypropylene (PP), polyethylene (PE), polystyrene (PS), and other suitable plastics and combinations thereof. The plastic material can be transparent or translucent such that a dimensional image or other indicia or printed matter can be seen therethrough. Alternatively, when it is not desired to view a dimensional image therethrough, the plastic material can be opaque.

Figure 3B:
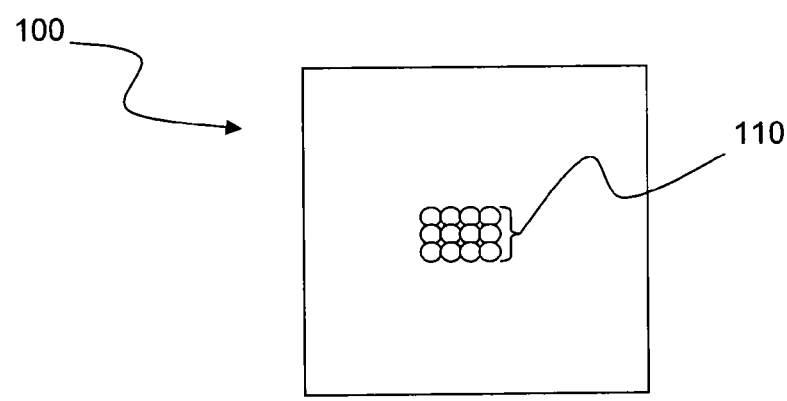
FIG. 3B is a top view of the lens sheet of FIG. 3A illustrating one variety of fly's eye lenses.
Figure 4:
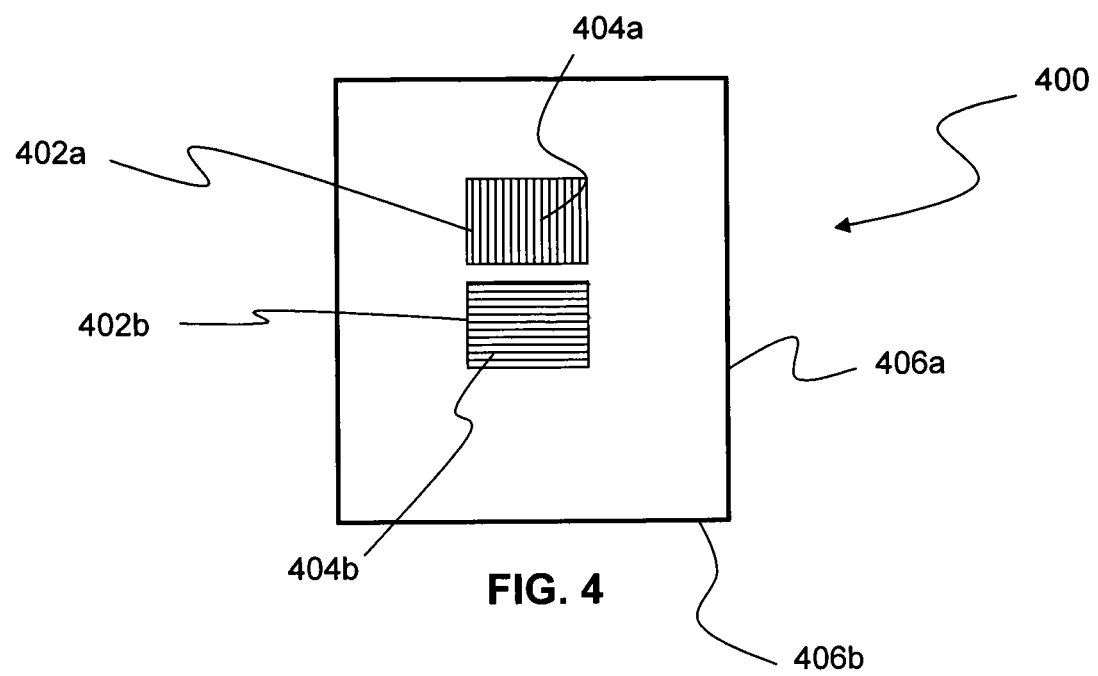
FIG. 4 is a front view of a piece with two lens arrays per piece, one array having lenses running perpendicular to the lenses of the other array, according to an embodiment of the present invention.

First surface 104 includes one or more areas defining a lens array 110, and one or more planar portions 112. Each lens array 110 comprises a plurality of light steering optical lenses 114, such as, for example, a lenticular, integral web (fly's eye), or any of a variety of suitable lens shapes such as round, oval, square, rectangular, triangular, or the like, and/or combinations thereof. In one embodiment of the invention, the lens array comprises an integral web or fly's eye array such that the animation can be incorporated in the horizontal, vertical, or diagonal direction, or any combination thereof. Lens array 110 can be completely within the borders of lens sheet 100, surrounded by planar or non-lens portions, such as illustrated in FIGS. 3 and 4, can make up one or more borders of the sheet (not shown), or can be a combination of both (not shown).

As illustrated in FIG. 3A, each lens 114 has a lens width 116 and a lens height 118. Lens array 110 lies at or below planar portion 112 such that a peak 120 of a lens 114 (or alternatively the peak 120 of each lens 114) lies flush with or below the plane formed by first surface 104, such that lens height 118 is equal to or less than sheet thickness 108. Therefore, the overall thickness or caliper of lens sheet 100 is equal to the sheet thickness 108. Sheet thickness 108 can range from about one mil to about 50 mils, or greater, such as from about 50 mils to about 100 mils or more. For traditional purposes, such as game cards or transaction cards, sheet thickness 108 can range from about 10 mils to about 50 mils. For thin film purposes, such as packaging, sheet thickness 108 can be 10 mils or less.

In one embodiment of the invention, a lens sheet comprises multiple select areas defining a lens array, each of the lens arrays being set below or flush with the planar areas of the first surface, and optionally, but not limited, completely contained within or bordered by non-lens or planar portions such that the arrays are discrete areas of the sheet. Multiple individual pieces can be converted from the lens sheet.

A first lens array comprises a plurality of lenses at a first lens pitch (lenses per inch), each of the lenses having a first lens height that is equal to or less than the sheet thickness, and a second lens array comprises a plurality of lenses at a second lens pitch, each of the lenses having a second lens height that is equal to or less than the sheet thickness. The first lens height of the lenses of the first array can be either substantially equal to or different from the second lens height of the lenses of the second array. Further, the first lens pitch can be the same as or different from the second lens pitch. Additionally or alternatively, a first optical focus or focal length of the first lens array is the same or different than a second optical focus or focal length of the second lens array. The optical focus or focal length is the distance at which a beam of collimated light will be focused to a single spot behind the lens when viewed through the front of the lens array.

In another embodiment of the invention, and referring to FIG. 4, a piece 400, such as a card, from a lens sheet comprises multiple lens arrays 402, including a first lens array 402a and a second lens array 402b. In this particular embodiment, each lens arrays 402a, 402b comprises a plurality of lenticular lenses 404. Lenses 404a of first lens array 402a are orientated in a first direction, e.g. parallel to a vertical side edge 406a of piece 400. A dimensional effect, i.e. motion or "flip", produced by lens array 402a coupled with an image, such as a first interlaced or Infinidepth® image, is observed when piece 400 is shifted or a viewing angle is shifted left-to-right and vice versa. Lenses 404b of second lens array 402b are orientated in a second direction different than the first direction, e.g. parallel to a horizontal side edge 406b of piece 400. A dimensional effect, i.e. motion or "flip", produced by lens array 402b coupled with an image, such as a second interlaced image or Infinidepth® image, is observed when piece 400 is shifted or a viewing angle is shifted top-to-bottom (or up/down) and vice versa. The first and second directions are not limited to being parallel to the side edges of piece 400, and any combination of orientations can be contemplated. In general, dimensional effect, i.e. motion or "flip", of a particular lens array is observed when piece 400 is in a direction substantially perpendicular to the orientation of that lens array.

In another embodiment of the invention, a first lens array has a first optical focus, and a second lens array has a second optical focus different than the first optical focus. The first optical focus is sufficient for viewing a dimensional image placed proximate the lens array, such as printed on the opposite surface of the sheet from the lens array. The second optical focus is greater than the first optical focus such that it is held at a distance from a dimensional image for viewing the image therethrough, such as in the case of a decoder/hidden message system.

Figure 5:
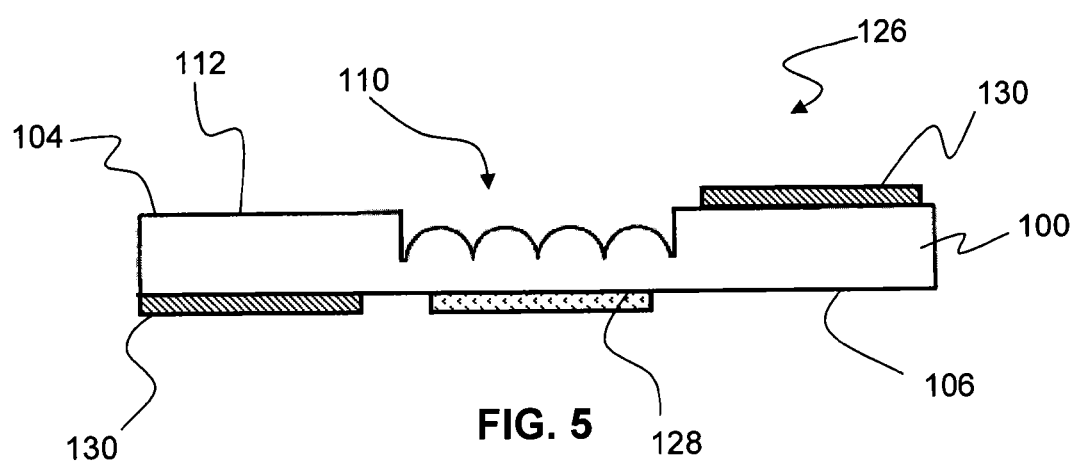
FIG. 5 is a cross-sectional view of a portion a printed lens sheet with a lens array according to an embodiment of the present invention.

Referring to FIG. 5, a display sheet 126 comprises lens sheet 100 having one or more lens array 110 and planar portions 112 on first surface 104. A dimensional printed image 128 is applied under each lens array 110 on second surface 106 such that printed image 128 is viewable through lens array 110, thereby creating a visual effect, such as three dimensionality, magnification, and/or animation, to a viewer.

Optionally, planar portions 112 of first surface 104 and/or second surface 106 can be printed or otherwise treated with one or more static images or layers 130, in addition to printed image 128 or as an alternative to printed image 128. In one embodiment, lens sheet 100 is sufficiently transparent or translucent such that any image(s) 130 printed on second surface 106 is viewable through planar portion(s) 112 of first surface 104. Images 130 can comprise such as text, variable data, graphics, patterns, logos, and/or ink layers such as colors, opaque ink such as flood or spot white, metallic, foil or any combination thereof, thereby adding to the visual aesthetic of the article having the display sheet thereon. In one particular embodiment, first surface 104 and/or second surface 106 are cold foiled, hot foiled, hot stamped, laminated, ebeam foiled, or otherwise spot foiled, such as described in U.S. Application Publication No. 2010/0086753 entitled "Foiled Articles and Methods of Making Same," incorporated herein by reference in its entirety. In another embodiment of the invention, multiple customized pieces can be fabricated from the lens sheet in which each piece contains variable data, such as described in U.S. Provisional Application No. 61/382,213 entitled "Mass Customization of Articles Having Dimensional and/or Animated Images," incorporated herein by reference in its entirety.

Printed image 128 and/or static image(s) 130 can be printed or otherwise applied directly onto second surface 106. Additionally or alternatively, printed image 128 and/or static image(s) 130 are applied to a second sheet (such as, for example, but not limited to, a backing sheet). The second sheet containing printed image 128 and/or static image(s) 130 is then correlated or registered with lens sheet 100 such that printed image 128 on the second sheet is viewable through lens array 110 on display sheet 126, and/or static image(s) 130 is viewable through planar portions 112 of display lens 100. In this situation, lens sheet 100, printed image 128, and second sheet make up a composite lens sheet or display sheet.

Optionally, one or more opaque ink layers can be applied over the printed image 128 and optional static image(s) 130 applied to second surface 106 such that additional printing or markings can be applied to second surface 106 that are not viewable through lens sheet 100, whether through lens array 110 or planar portions 112 of first surface 104. In an alternative embodiment, an opaque backing sheet, such as a plastic or paper backing sheet or a laminate can be applied to second surface 106 over any printing thereon. The backing sheet can be applied by any known means in the art, such as, for example, adhesives or other bonding techniques.

Additional layers can be applied either directly to the second surface or the backing sheet (if present). These additional layers can comprise, for example, text, variable data, graphics, logos, personal identification numbers (PIN), account numbers, machine-readable indicia such as magnetic stripes, barcodes, RFID, QR codes, and the like, or any combination thereof. In one particular embodiment, indicia such as a barcode or magnetic stripe is printed on the second surface or the backing sheet (if present) on a side opposite the lens sheet. A laminate or other protective coating is then applied over the indicia, such as described in U.S. Provisional Application No. 61/480,213, entitled "Articles Having Machine or Human Readable Indicia Imaged Under a Tamper Proof Layer for Theft Prevention," incorporated herein by reference in its entirety. Alternatively, the indicia can be applied to the second surface or backing sheet (if present) such that it is "readable" or identifiable through the first surface and/or lens array. In yet another alternative embodiment, the indicia is applied to the planar portion of the first surface and a protective laminate or other coating is applied over the indicia.

Images 128 and 130 can be printed using any of a variety of suitable printing techniques, such as, for example, flexographic, lithographic, gravure, rotogravure, digital inkjet, digital toner, screen printing, and the like or combinations thereof. Images 128 and 130 can be printed using traditional and non-traditional inkjet ink, dry offset ink, litho ink, flexo ink, silk screen ink, latex ink and the like in one of the aforementioned printing techniques or combination of techniques. The inkjet ink used may be a traditional solvent- or UV-based ink. In one embodiment, UV curable inks can be used, such as SUNCURE inks commercially available from Sun Chemical of Carlstadt, N.J., and UV curable inks commercially available from Flint Inks of St. Paul, Minn. Other suitable printing materials or media can include toners, water- or solvent-based inks, solventless inks, other forms of radiation curable inks, or combinations thereof. The printing media is optionally cured with one or more appropriate curing system as needed.

Referring to FIG. 5, dimensional image 128 is printed directly onto lens sheet 100, and/or onto another substrate that is laminated to lens sheet 100. In one embodiment of the invention, dimensional image 128 is printed using an image technique that does not require precise color-to-color or ink-to-ink registration accuracy. For example, one image technique is one-color animation where the animation image is incorporated in a single color of the process colors, such as a 4-CP image. In other embodiments of the invention, the image technique is multi-color animation where the several colors are located in the same area of a substrate but animation is independent with respect to each color. In another embodiment of the invention, the image technique is a form of hologravure, otherwise known as Infinidepth®, which includes a holographic fringe pattern that gives a depth or 3D effect, again incorporated in a single color of the process colors, such as a 4-CP separation or image. In yet another embodiment of the invention, the image technique is bi-directional interlaced imaging in which two or more images are interlaced in two directions, such as horizontally and vertically. In yet another embodiment of the invention, a combination of one or more of these image techniques is incorporated.

In one embodiment of the invention, multiple interlaced images are printed that correspond to multiple lens arrays, each lens array having its own orientation, pitch, shape, and dimensions the same or different from the other lens array(s). In particular, and referring back to FIG. 4, a first interlaced image can comprise two or more images interlaced and printed or otherwise mounted in a first orientation for viewing through first lens array 402*a*. A second interlaced image can comprise two or more images interlaced and printed or otherwise mounted in a second orientation for viewing through second lens array 402*b*.

In an alternative embodiment not shown, a lens sheet comprises a fully flooded lens sheet in which the first surface is entirely made up of lenses, including multidirectional lens arrays. For example, a first lens array comprises lenses oriented in a first direction, and a second lens array comprises lenses oriented in a second direction different from the first direction. For example, a picture frame is formed from a multidirectional lens sheet. An outer border comprises lenses oriented in a first direction, such as a substantially horizontal direction, while an inner portion comprises lenses oriented in a second direction different than the first direction, such as a substantially vertical direction.

In an alternative embodiment of the invention not shown, lens sheet does not include a dimensional printed image such that each lens array is its own feature. In one particular example, each lens of a lens array are individually formed into a recognizable or trademarked shape, and/or the array as a whole, i.e. the perimeter shape of the array, is formed into a recognizable or trademarked shape. In yet another embodiment of the invention, a lens sheet includes a first lens array having no dimensional printed image bonded thereto, and a second lens array having a dimensional printed image bonded thereto, as described above. The endless combinations of printing, number of lens arrays, lens shapes, dimensions, and lens array orientations is selected based upon the desired level of stimulation of the consumer.

A variety of lens sheet combinations are herein described. At least one of the lens arrays of each embodiment includes a plurality of lenses flush with or below the lens-free area as previously described.

Figure 6:
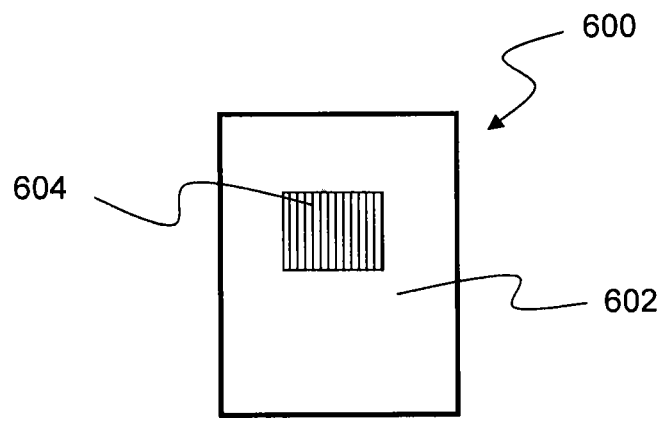
FIG. 6 is a front view of a piece with a lens array and matte finish according to an embodiment of the invention.

Referring to FIG. 6, a lens sheet can comprise one or more pieces 600, such as cards, that are ultimately cut out of the lens sheet. Piece 600 comprises at least one lens-free area 602 and at least one lens array 604 flush with or below lens-free area 602. In this particular embodiment, lens-free area 602 comprises a matte finish.

Figure 7:
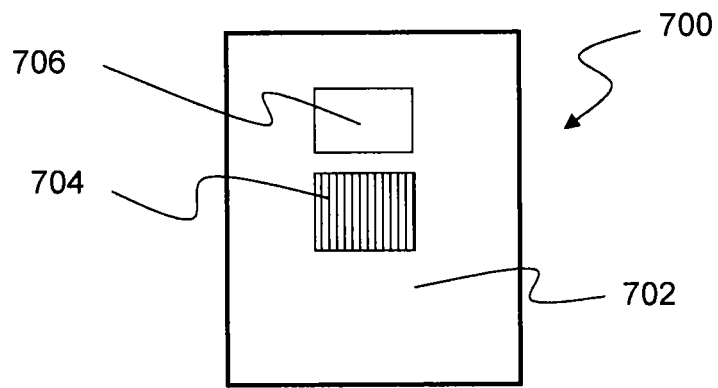
FIG. 7 is front view of a piece with a lens array, a gloss area, and a matte finish according to an embodiment of the invention.

Referring to FIG. 7, piece 700 comprises at least one matte lens-free area 702, at least one lens array 704 flush with or below lens-free area 702 and at least one discrete gloss lens-free area 706. In this example, gloss area 706 is registered with respect to the length and width of piece 700 such that it is fully nested within the perimeter of piece 700. However, it can also be contemplated that gloss area 704 comprises at least part of one or more edges of piece 700. Alternatively (not shown), a matte area can be registered in a select position, and the remaining lens-free portions comprise gloss areas.

Figure 8:
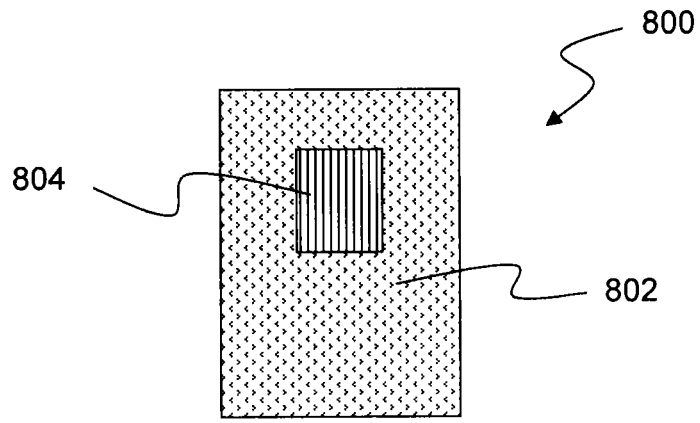
FIG. 8 is a front view of a piece with a lens array, and a textured finish according to an embodiment of the invention.

Referring to FIG. 8, piece 800 comprises at least one lens-free area 802 and at least one lens array 804 flush with or below lens-free area 802. At least a portion of lens-free area 802 comprises a texture, such as a wood grain, bump or football texture, polka-dotted, or any of an unlimited variety of textures, such that it is unsmooth.

Referring to FIG. 9, piece 900 comprises at least one lens-free area 902 and at least one lens array 904 flush with or below lens-free area 902. Lens array 904 comprises a "spot square" array, i.e. an integral or square fly's eye pattern, although any other shape can be contemplated as described supra. Lens-free area 902 can comprise a matte finish, gloss finish, textured finish, or any combination thereof, as described above.

Figure 10:
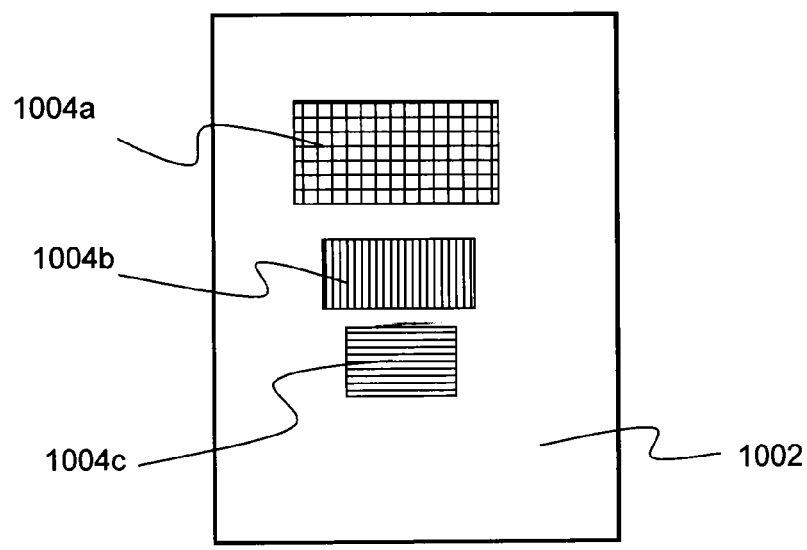
FIG. 10 is a front view of a piece with three different lens arrays thereon, including an integral fly's eye array and two lenticular arrays running perpendicular to one another, according to an embodiment of the invention.

Referring to FIG. 10, piece 1000 comprises at least one lens-free area 1002, a first lens array 1004*a*, and at least another lens array 1004*b* different in at least one of pitch, shape, size, type, orientation, than first lens array 1004*b*. In this particular example, first lens array 1004*a* comprises a "spot square" array, i.e. a square fly's eye pattern oriented in a first direction, and second lens array 1004*b* comprises a lenticular lens array orientated in a second direction, either the same or different than the first direction. Piece 1000 can further comprise a third lens array 1004*c*, such as a lenticular lens array, oriented in a third direction different than the second direction. Lens-free area 1002 can comprise a matte finish, gloss finish, textured finish, or any combination thereof, as described above.

Figure 11:
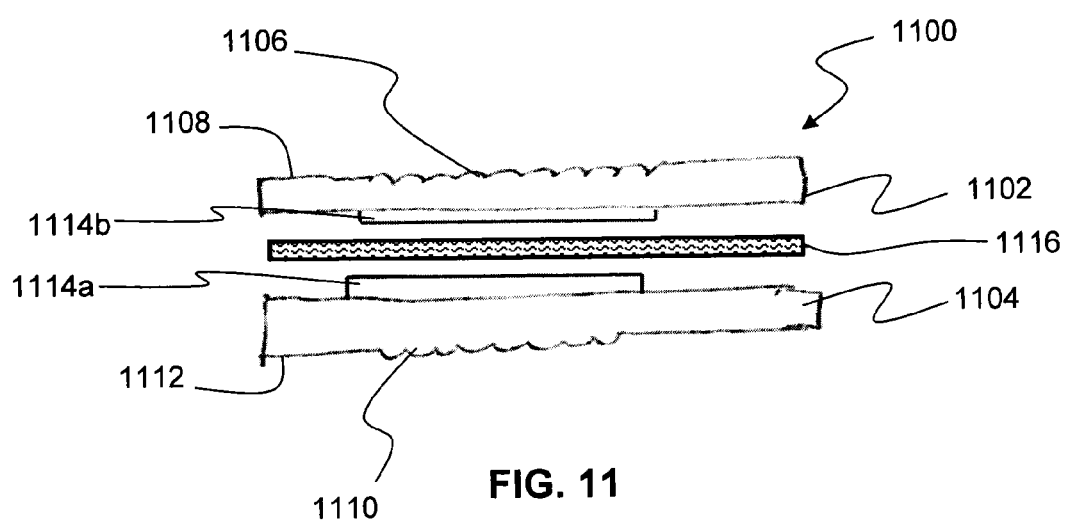
FIG. 11 is a cross-sectional view of a composite piece including two lens sheets according to an embodiment of the invention.

Referring to FIG. 11, piece 1100 comprises a composite piece having a first lens sheet 1102 coupled to a second lens sheet 1104. At least lens sheets 1102 comprises at least one lens array 1106 flush with or below a lens-free area 1108. Lens sheet 1104 can comprise at least one lens array 1110 flush with, below, or raised above a lens-free area 1112. At least one ink layer 1114a, 1114b is optionally printed or otherwise place behind lens sheets 1102, 1104. An optional opaque or translucent adhesive layer and/or laminate layer 1116 can be sandwiched between the two lens sheets.

Figure 12:
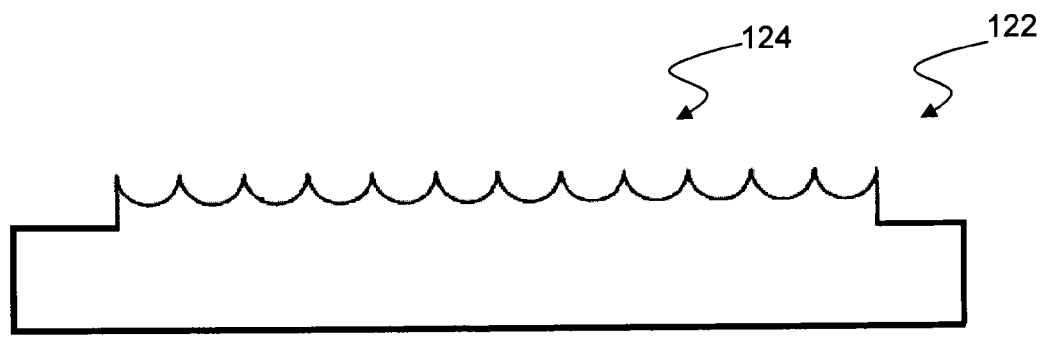
FIG. 12 is an exploded cross-sectional view of a portion an engraved lens pattern according to an embodiment of the present invention.

As illustrated in FIG. 12, spot lens sheets can be formed by extrusion, embossing, or casting using an engraved, or otherwise formed, cylinder or plate 122, having an inverse lens pattern 124 defined thereon. Lens pattern 124 is the inverse or relief of lens array 110 of FIGS. 3A and 3B. As depicted, lens pattern 124 is raised from the surface of the cylinder or plate, thereby forming lenses on first surface 104 in which the peak of the lenses lie at or below the planes form by first surface 104.

To make a lens sheet or piece with multiple lens arrays in multiple directions, such as piece 400 or sheet of such pieces, a flat plate is engraved as described above with bidirectional or multidirectional patterns, and a clear lens material is pressed or embossed with the pattern either before or after printing. Alternatively, a cylinder is engraved with bidirectional or multidirectional patterns to form a clear lens sheet via extrusion. Alternatively, a stamper can be engraved with a spot lens, bi-directional or multidirectional pattern, and the lens sheet is created by injection molding.

Lens pattern(s) 124 can be formed directly onto a cylinder surface or a plate surface by any of a variety of processes with sufficient precision including, but not limited to, mechanical machining such as diamond turning or single point diamond turning, laser engraving, etching, or combinations thereof. In an alternative embodiment of the invention, lens pattern 124 is formed in a flat, thin plate, and subsequently coupled to a cylinder by adhesive, magnetism, or other attachment mechanisms. In this case, lens pattern 124 is formed in the plate to account for its use on a curved cylinder. Alternatively, lens pattern 124 can be cut or engraved into a cylinder, and thereafter formed into a plate by unwrapping or peeling away a layer of the cylinder. The plate can also be used as a stamper in injection molding processes.

Figure 13:
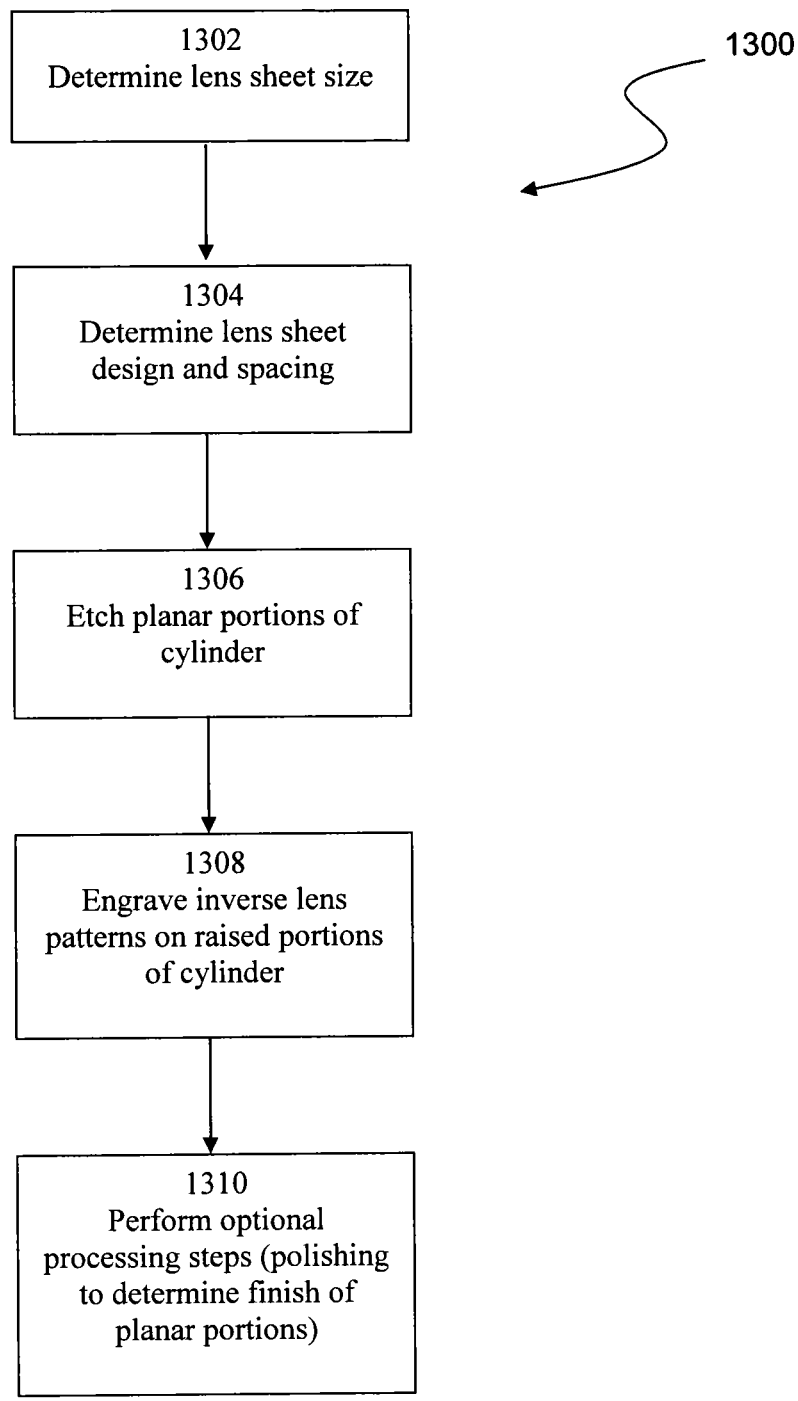
FIG. 13 is a flow diagram for patterning a cylinder used to produce lens sheets according to an embodiment of the present invention.

In one particular embodiment of the invention, and referring to the process flow diagram of FIG. 13, a method 1300 for engraving or patterning a cylinder for producing lens sheets according to embodiments of the invention is illustrated. At 1302, a desired lens sheet size is determined based on constraints of the subsequent extrusion or embossing process and/or the printing process. For example, a lens sheet can have a maximum length (i.e. direction of travel through the printing press), due to printing press constraints, of 28.375". It can be generally advantageous to run a sheet that is no wider than it is long. Therefore, a desired sheet size in the example is a square sheet having dimensions of 28.375"×28.375". Based on the value of the cylinder diameter of a particular extrusion process, the cylinder circumference is then calculated using the formula: cylinder circumference=$\pi$* cylinder diameter. For example, a maximum cylinder diameter of a particular extrusion process can be 18.0732" which gives a maximum cylinder circumference of 56.75." The maximum number of lens sheets per revolution of the cylinder is then determined. For example, a cylinder circumference of 56.75" allows two sheets having a length of 28.375" (and width of 28.375") to be produced in a single revolution. The method is not limited to the example; rather, depending on the cylinder and/or printing press capabilities, one can adjust the sheet size and/or cylinder dimensions accordingly. For example, if the cylinder diameter is a constraint, the sheet size can be adjusted to fit the cylinder accordingly. Additional or alternatively, if the subsequent printing process is a constraint, such as a sheet width and/or length maximum, the cylinder dimensions can be adjusted accordingly. Method 1300 is a hybrid of both lens sheet dimension limitations based on printing press capabilities, and cylinder dimension limitations based on extrusion, casting, or embossing capabilities, such that the optimum sheet size is determined within the bounds of the printing press and cylinder constraints.

At 1304, the desired sheet design is determined, i.e. the position of the one or more lens arrays on each lens sheet is determined. For example, if multiple pieces are formed from one lens sheet, one or more arrays or pattern of arrays can be repeated over the length and/or width of the sheet. It is important that the position of each lens array (both across the width and along the length of the sheet) is tightly controlled so that it is substantially the same from sheet to sheet within a tolerance. This tight registration is to ensure that the subsequent printing of the lens sheet is highly registered. In one particular embodiment, illustrated in FIG. 14 using a lens sheet 1400 having multiple lens arrays 1402, a tolerance is $\frac{1}{32}$" in each of the x and y positions from sheet to sheet, the x position being along the length of the sheet at a distance "x" from a side edge 1404a, and the y position being across the width of the sheet at a distance "y" from a side edge 1404b.

Referring back to FIG. 13, at 1306, flat areas corresponding to the planar portions of the lens sheet are etched from the surface of the cylinder, thereby leaving discrete raised areas or "islands" corresponding to the lens arrays, their locations being determined by the desired sheet design. The sheet design is repeated along the circumference of the cylinder based on the number of sheets per revolution to be produced. In one embodiment of the invention, the flat areas are formed by photo-etching. A photo-mask of the desired lens sheet pattern is formed from a negative photo resist material over the cylinder. The photo resist material is exposed, therefore forming insoluble areas in areas of the cylinder corresponding to the lens array areas on the lens sheet(s). The unexposed or unprotected areas are etched away using an acid bath. The etched areas define the "flat" or planar areas of the lens sheet. The photo-resist is then removed from the resulting raised areas. Alternatively, laser etching can be used to etch the planar areas. Alternatively, a laser etching process can be used.

At 1308, the raised areas are engraved, such as by laser engraving or diamond tool engraving, to form the inverse lens pattern 124 (of FIG. 12) of each lens array of the sheet(s).

At 1310, optional processing steps are also contemplated. For example, one or more flat areas can be polished to form a resulting gloss, semi-gloss, or matte pattern on the resulting sheet. Alternatively, a texture or other pattern can be introduced into the cylinder. Such textures can include, for example, a wood grain, a "bump" pattern such as a football pattern or a polka-dotted pattern, cross-hatching, or any of an unlimited variety of patterns. For example, to produce a lens sheet with one or more gloss planar portions, the flat areas of the cylinder are polished to a finish referred to as an "A2" finish according to SPI Standards (the plastics industry trade association). An "A-2" finish is an A-2 Grade #6 Diamond Buff which is similar to an A-1 diamond finish but with less shine. To produce a lens sheet with one or more matte planar portions, the flat areas of the cylinder are polished to a finish of a D-finish, which is a dry blast finish, which can vary due to the material blasted, the amount of pressure used, and the distance the blast is applied. A table of different finishes per the SPI Standards is included below. Alternatively, a matte finish can be accomplished by applying a light texture, such as an MT 11010 fine texture, known to one of ordinary skill in the art as a subtle and shallow texture of fine grained character.

TABLE 1

Finish per SPI Standards

| Grade | Description |
|---|---|
| A-1 Grade #3 Diamond Buff | The finest diamond finish mostly used for finishing clear lenses, optics and critical cosmetic parts |
| A-2 Grade #6 Diamond Buff | Close to an A-1 diamond but with less shine than A-1 diamond. Typically used on molds that produce cosmetic parts. |
| A-3 Grade #12 Diamond Buff | Close to an A-2 diamond but with less shine than A-2 diamond. Typically used on molds that produce cosmetic parts that don't require a high finish. |
| B-1 600 Grit Paper | The highest finish before diamond process. Mostly used on highly cosmetic parts that are chrome plated or painted (Close to A-3 diamond with a directional pattern). |
| B-2 400 Grit Paper | Close to a B-1 paper finish, but with a deeper directional pattern. Less shine than a 600-paper finish. |
| B-3 320 Grit Paper | Almost like a B-2 paper finish, but with a slightly deeper directional pattern. |
| B-4 240 Grit Paper | Deeper directional pattern than 320 paper finish typically used after stone for ease of finishing and appearance. |
| B-5 P180 Grit Paper | Deeper directional pattern than 240 paper finish typically used after stone for ease of finishing and appearance. |

Note: Paper grit finishes are not equivalent to their stone counterparts. (Example: A320 paper finish = approx. a 600 stone finish, 320 paper is twice as fine as 320 stone.)

| | |
|---|---|
| C-1 600 Stone Finish | Fine smooth finish mainly used on small detailed areas where paper finish is not feasible. |
| C-2 400 Stone Finish | Slightly rougher finish than 600 stone. Mainly used for removal of fine machined finishes, where rougher stones may not necessary to use. |
| C-3 320 Stone Finish | General purpose starting and finishing stone to remove machine finished. |
| C-4 220 Stone Finish | General purpose starting stone to remove rougher machined finishes. Deeper finish than 320-400 stone may be used for final finishing. |
| C-5 150 Stone Finish | Mostly used to remove very rough machined finishes. |

Note re D-finishes: Dry blast may vary due to material blasted; the amount of pressure used and at what distance blast is applied. Blast material will break down and can't be used indefinitely to achieve same results at given specification.

In one particular embodiment of the invention, optional registration marks are etched or engraved into the cylinder during the etching process in 1306, and/or in the optional processing step 1310. The registration marks can indicate, for example, the position indicating the end of one sheet and beginning of another sheet. A detector in a cutting system of the extrusion process reads or detects the registration mark embossed in the plastic lens sheet during the extrusion process from the cylinder, which in turn triggers a cutting device to cut in an exact location, resulting in a highly registered cut sheet. Additionally or alternatively, registration marks can be etched into the cylinder to therefore form physical marks in the resulting sheet for the purposes of printing registration. A device on a subsequent printing process reads or detects the registration mark, triggering the printing head of a print engine to print at a specific location on the sheet. For example, referring back to FIG. 14, lens sheet 1400 includes a registration mark 1406 either in the form of a printed or physical mark in the surface of the sheet.

Figure 14:
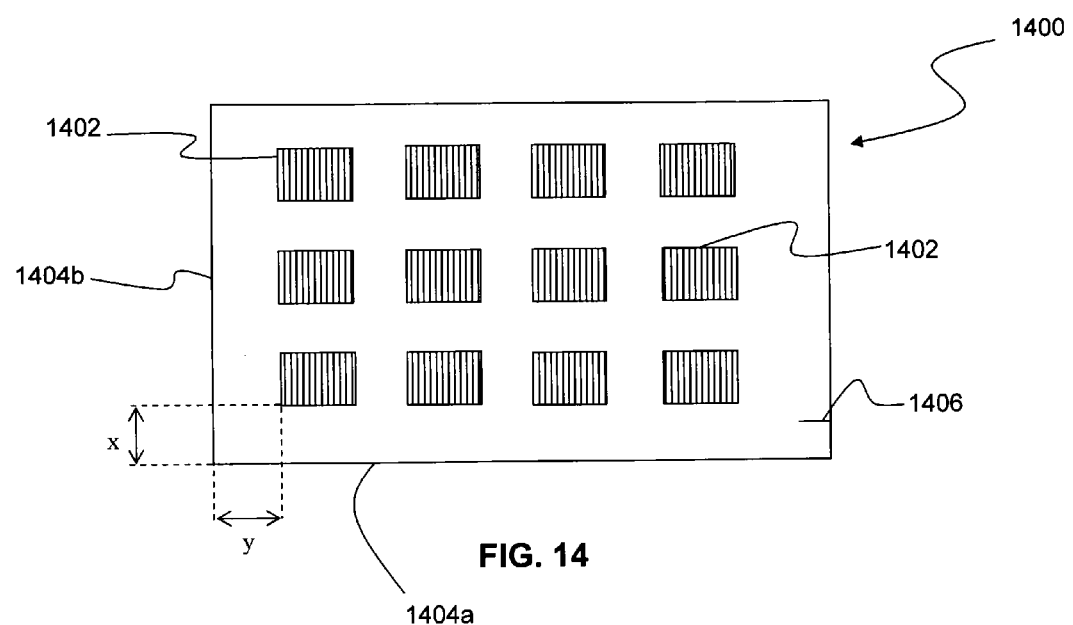
FIG. 14 is a front view of a lens sheet including multiple lens arrays prepared by the method of FIG. 13.
Figure 15:
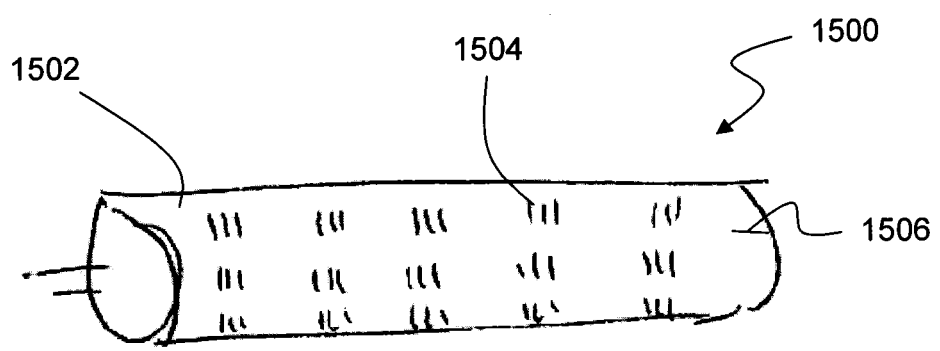
FIG. 15 is a perspective view of a cylinder used to produce a lens sheet according to the method of FIG. 13.

Referring to FIG. 15, a cylinder 1500 formed from method 1300 is illustrated. Cylinder 1500 includes flat areas 1502, and raised engraved areas 1504 comprising the inverse of one or more lens patterns. In this embodiment, raised engraved areas 1504 comprise discrete "islands" within flat areas 1502. In an alternative embodiment (not shown), one or more raised areas can extend the entirety of the circumference of the cylinder, or the width of the cylinder depending the desired lens pattern. Further, cylinder 1500 includes registration marks 1506. Cylinder 1500 allows a lens sheet to be manufactured with registered "spot" patterns of lens arrays, such as shown in FIG. 14. The spot patterns are registered within tight tolerances, such as $\frac{1}{32}$" or less, both across the sheet and along the length of the sheet, as shown in FIG. 14.

Subsequent to preparing the patterned cylinder or plate, the patterned cylinder or plate is placed into a lens sheet process of manufacture. Inverse lens pattern 124 as shown in FIG. 12 of each lens array is then transferred to a sheet material using known conventional extrusion and/or embossing methods, thereby forming lens array 110 (FIGS. 3A, 3B) on the sheet in the desired select areas only. If registration marks are present, the sheets are automatically cut at a preselected location upon detection of the registration mark by the appropriate sensing device. Additionally or alternatively, the extrusion line or embossing line can comprise slitting wheels positioned on one or both edges of the sheet to trim excess side edge material from the sheet so that the sheet is trimmed to the desired length and width.

Printed display sheets, such as display sheet 126 of FIG. 4, can be fabricated using a number of low cost, high speed processes, many of which are described in detail in U.S. Patent Application Publication No. 2010/0134895, which was previously incorporated by reference in its entirety. In one embodiment of the invention, a high speed printing process, such as a digital printing system, using a pre-fabricated lens web or sheet having one or more lens arrays 110 in select locations across and down web is used. The lens array film web or sheet is formed by embossing, casting, casting and curing, extrusion, or the like, as described above.

In another embodiment, a web press is used incorporating inline printing and embossing such that a transparent film is printed on the first and/or second surfaces of the film before and/or after a lens array is embossed on the first surface of the film in select locations. Alternatively, discreet sheets are printed on the first and/or second surface before and/or after a lens array is embossed on the first surface of the film in select locations.

In yet another embodiment of the invention, a web press is used incorporating inline printing and extrusion, such that a transparent film is extruded onto a patterned cylinder to form the lens array in select locations, and printed on the first and/or second surfaces of the film. Alternatively, discreet sheets are extruded and then printed on the first and/or second surface. In yet another embodiment of the invention, a web press is used incorporating inline printing and casting, such that a coating is cast onto a film and subsequently patterned and optionally cured to form the lens array in select locations, and printed on the first and/or second surfaces of the film before and/or after forming the lens array. Alternatively, discreet sheets are formed.

The display devices including the lens sheet and printed image or lens sheet alone, according to embodiments of the invention, can be used in a wide variety of applications and articles. It can be subsequently converted or manufactured into packaging films, labels, stickers, or wrappers that later can be applied to or around a formed product or formed products. Alternatively, the device can be used alone, or laminated to one or more other substrates to form the article itself, such as a wrapper, bottle, poster, flexible packaging, or the like. In yet another embodiment, the dimensional image display device comprises a rigid article, such as, for example, a gift card, transaction, debit, or credit card, a loyalty card, a trading card, a game piece, an identification card, a key card, a postcard, or any of a variety of rigid cards or pieces. In another embodiment, the dimensional image display device can be used in security applications such as, for example, security labels, tax stamps, identification cards and documents, checks, currency, authentication labels, and the like. For example, an authentication label incorporating a dimensional image display device for high end often copied products can be useful for ease of identification by a customs agent to identify a copied product.

In one embodiment of the invention, the display device is incorporated on a curved surface, such as the surface of a cup or other container. The display devices can form the cups themselves, such as a single use cup, or can be used as inserts or sleeves in injection molded cups, or can be used as labels for application to a curved surface. The printed dimensional image is printed to accommodate for the curved surface, such as printing along an arc corresponding with a sweep angle of the curved surface. Such printing is described in, for example, U.S. Application Publication No. 2008/0088931 entitled "Layered Image Display Sheet," previously incorporated by reference in its entirety, and U.S. Pat. No. 6,490,092 entitled "Multidimensional Imaging on a Curved Surface using Lenticular Lenses," incorporated herein by reference in its entirety.

In one particular embodiment of the invention, the dimensional image display sheet comprises a game card having a first surface with one or more lens arrays embossed thereon. The lens arrays lie below the plane of the first surface and are completely or at least partially contained within the borders of the game card. A printed image is printed on a second, generally planar surface of the lens or a second substrate positioned under at least a portion of the lens array such that the printed image is viewable through the lens array. The optical characteristics of the lenses, i.e. shape, density, lens dimensions, etc. coupled with the printing technique used to print the image allows for a visual effect, such as three dimensionality and/or motion to be experienced by the viewer when viewing the image through the lens array. One or more static images and/or aesthetics are printed on the planar portions of the first surface and/or the second surface and/or optional second substrate such that it is viewable through the planar portions of the first surface.

The lens sheets, with or without printing, according to embodiments of the invention having a lens array below or flush with the planar surface of the lens sheet allows for a more uniform or consistent caliper as no lenses extend beyond the planar portions of the sheet. Lens sheets with recessed or flush lens arrays can be stacked into a flat stack, or can be rolled into a flat web, eliminating or reducing any bulging. The overall flatness of the sheet provides many advantages. For example, the lens sheets according to embodiments of the present invention can be more easily printed than lens sheets of the prior art because the lens sheets present generally flat surfaces to a printing process with no lenses extending above the surface such that even pressure can be maintained during printing. Further, the flat stacks or rolls are more readily handled in autofeed processes. Finally, by incorporating the lens array within the body of the sheet, instead of extending from it, similar visual aesthetics as the prior art sheets can be accomplished at thinner calipers.

EXAMPLE

Figure 16:
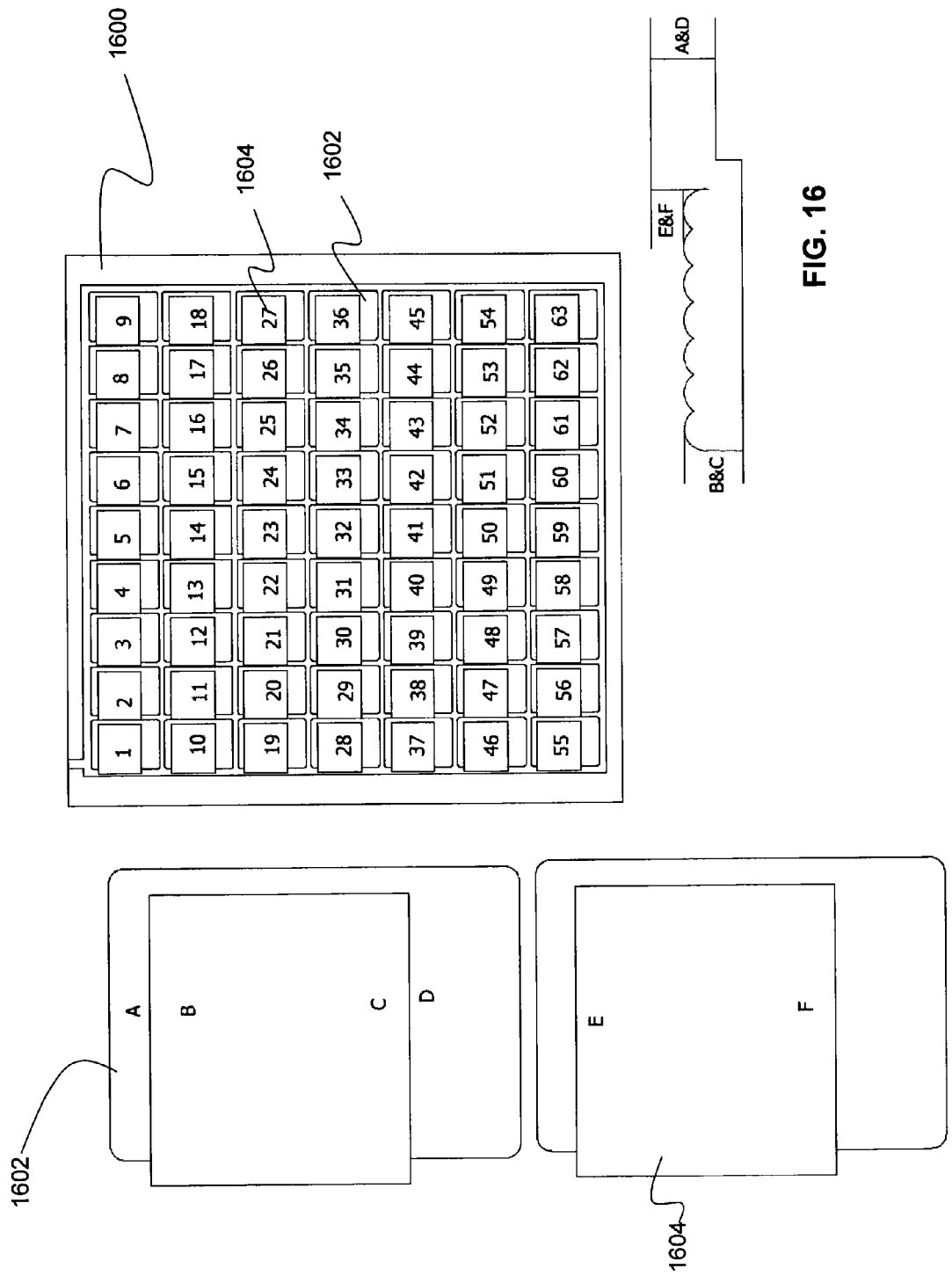
FIG. 16 is a schematic of a lens sheet with multiple pieces, and an individual piece with points of measurement according to an embodiment of the present invention.
Figure 17A:
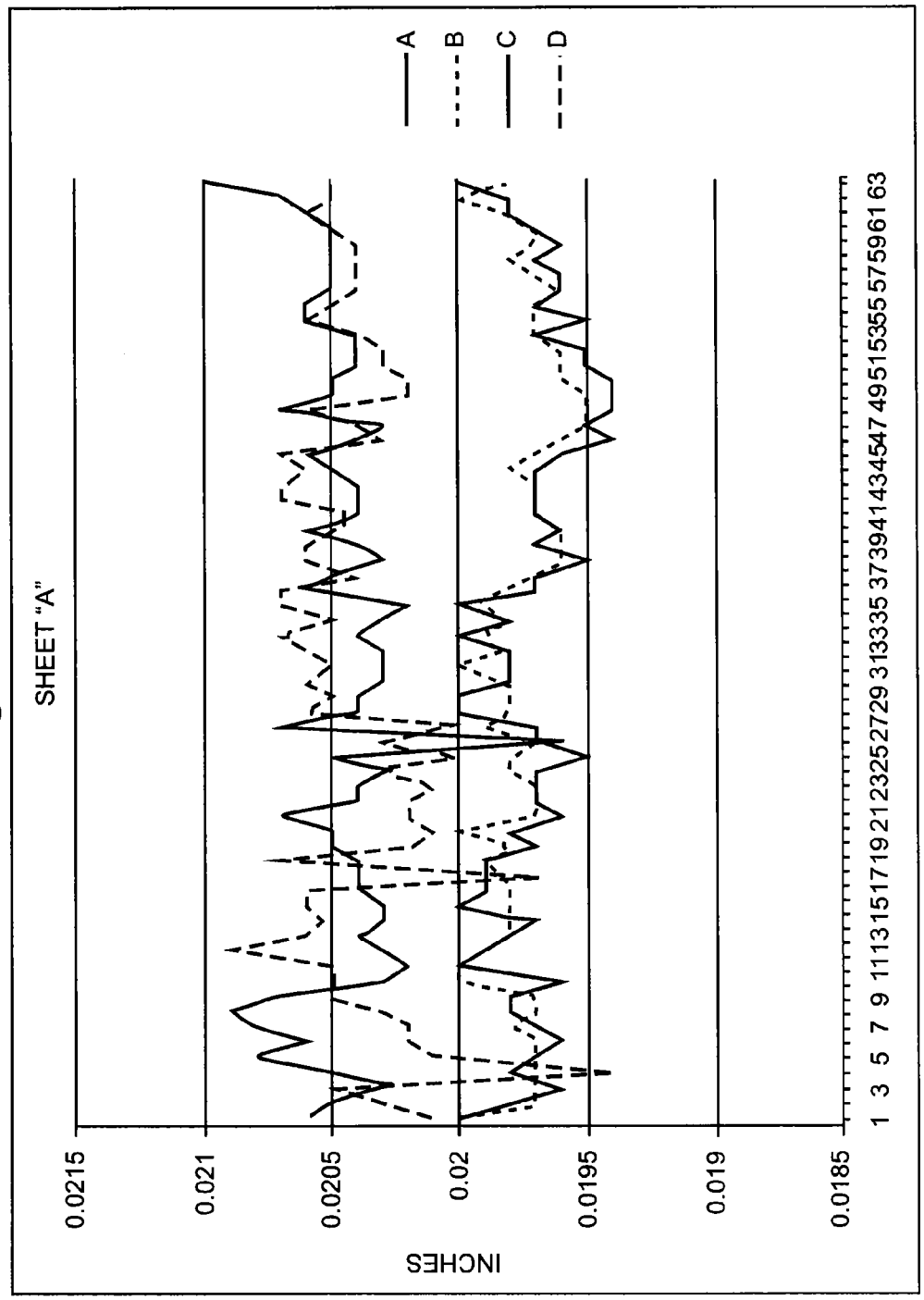
FIG. 17A is a graph of caliper measurements of Sheet A of the Example at locations A-D.
Figure 17B:
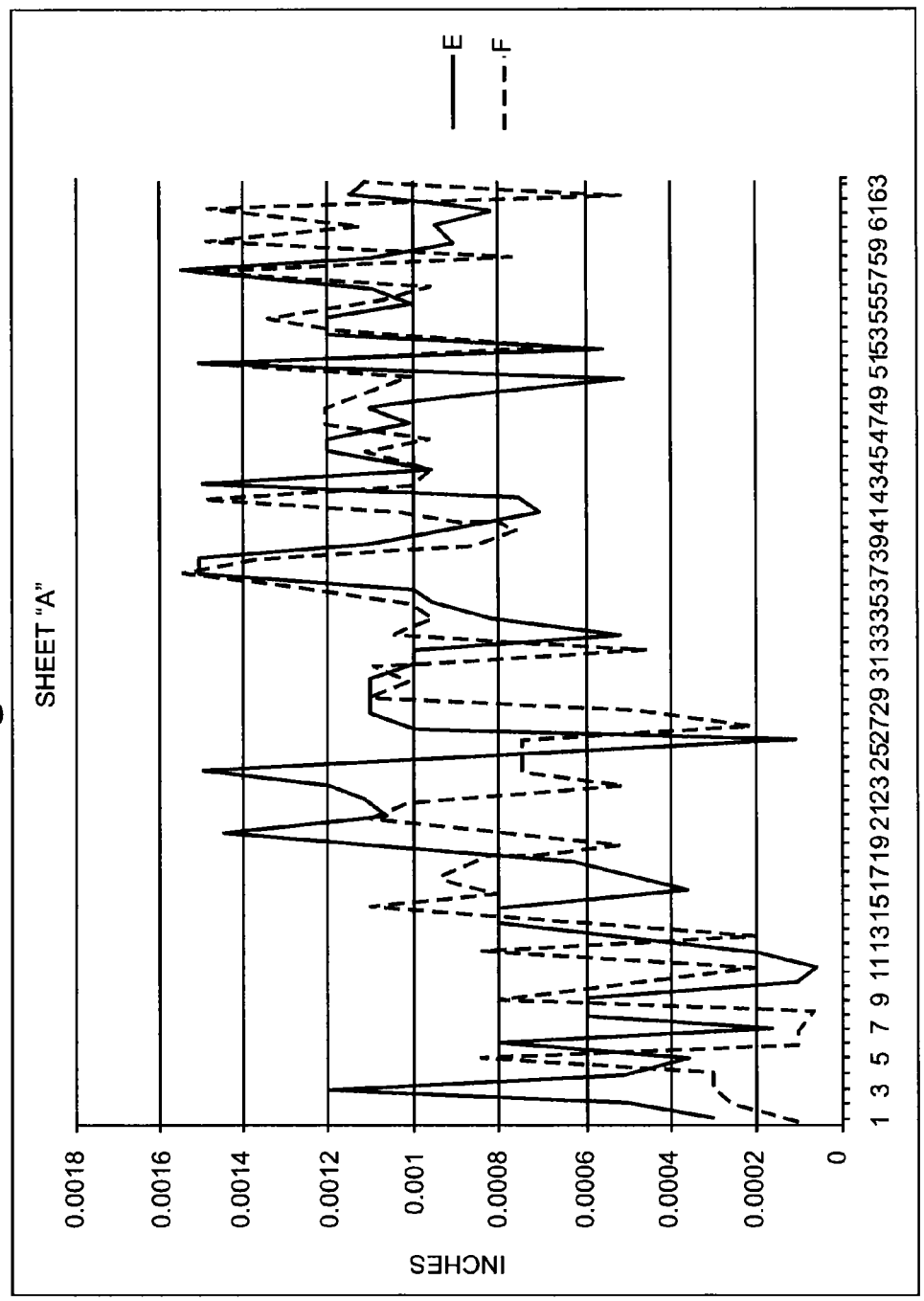
FIG. 17B is a graph of caliper measurements of Sheet A of the Example at locations E-F.
Figure 18B:
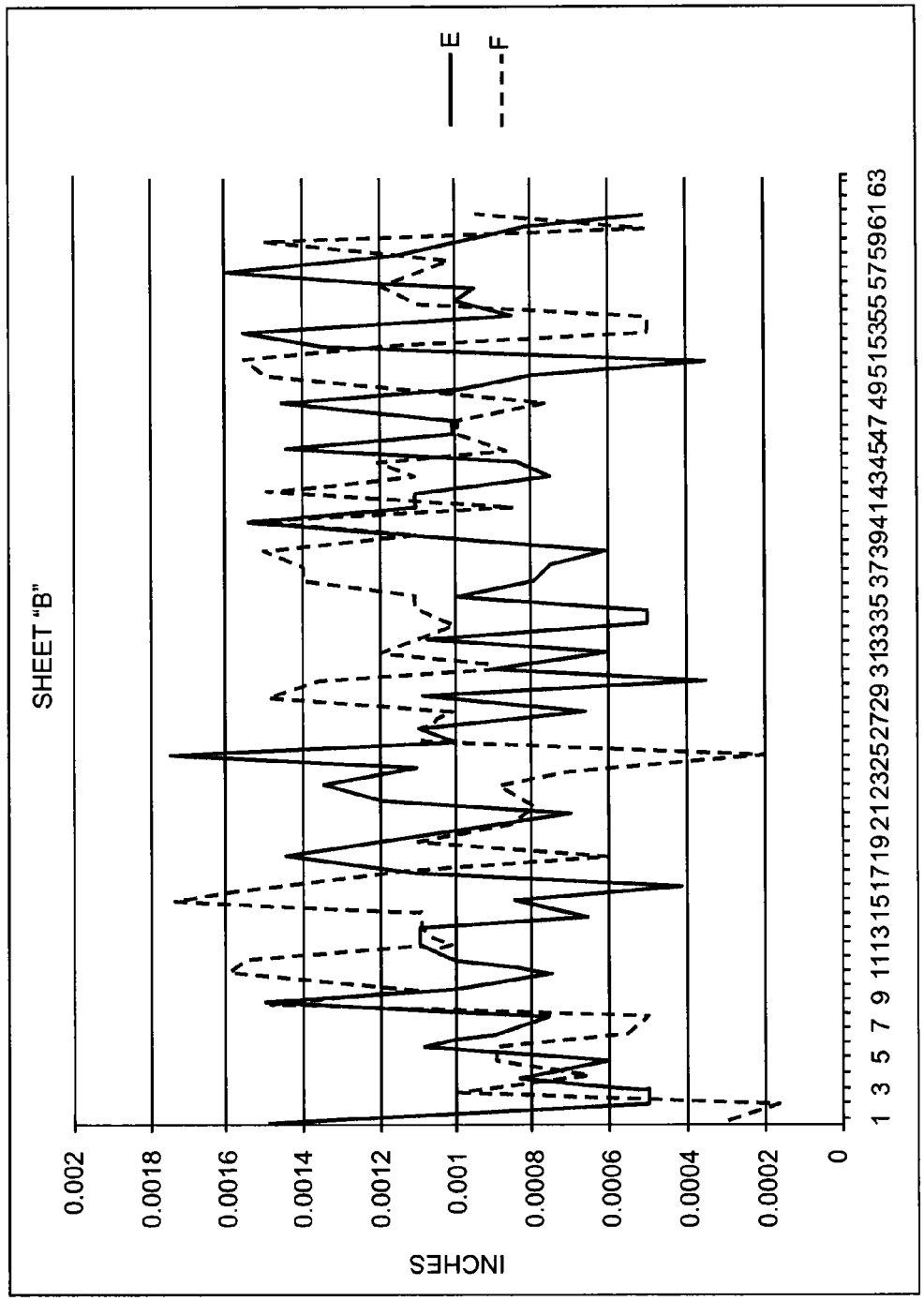
FIG. 18B is a graph of caliper measurements of Sheet B of the Examples at locations E-F.

Referring to FIG. 16, caliper or thicknesses of two sheets 1600 ("Sheet A" and "Sheet B" of cards 1602 having lens arrays 1604 were measured. Each sheet 1600 comprises APET. Each sheet 1600 includes sixty-three nested cards 1602. Sheets 1600 were made in a single run using an engraved or patterned cylinder. The APET was extruded onto the cylinder. The extrusion parameters were the same for both sheets.

Six measurements at points A-F were made on each card 1602 of each sheet 1600. As shown in the cross-section, measurements A and D represent the thickness of the planar or gloss/gloss portions measured with a Mitutoyo micrometer, measurements B and C represent the thickness of the lens array from base to lens peak also measured with a Mitutoyo micrometer, and measurements E and F represent the step height from the peak of the lenses of the lens array to the planar top surface or gloss area of the card measured with a Starrett Step Micrometer.

The measurement results in Tables 2 and 3 below, and in the graphs of FIGS. 17A-18B. The results include an individual measurement at each location A-F for each card of each sheet. From this data, one can calculate a number of statistics, such as, for example, but not limited to sample mean, variance, standard deviation, or any of a number of statistical calculations as appropriate.

TABLE 2

Measurements for Sheet A (Inches)

| | A | B | C | D | E | F |
|---|---|---|---|---|---|---|
| 1 | 0.0206 | 0.02 | 0.02 | 0.0201 | 0.0003 | 0.0001 |
| 2 | 0.0205 | 0.0197 | 0.0198 | 0.0203 | 0.0005 | 0.00025 |
| 3 | 0.0203 | 0.0197 | 0.0196 | 0.0205 | 0.0012 | 0.0003 |
| 4 | 0.0205 | 0.0197 | 0.0198 | 0.0194 | 0.0005 | 0.0003 |
| 5 | 0.0208 | 0.0197 | 0.0197 | 0.0201 | 0.00035 | 0.00085 |
| 6 | 0.0206 | 0.0197 | 0.0196 | 0.0202 | 0.0008 | 0.0001 |
| 7 | 0.0208 | 0.0198 | 0.0197 | 0.0202 | 0.00015 | 0.0001 |
| 8 | 0.0209 | 0.0197 | 0.0198 | 0.0203 | 0.0006 | 0.00005 |
| 9 | 0.0207 | 0.0197 | 0.0198 | 0.0205 | 0.0006 | 0.0008 |
| 10 | 0.0203 | 0.02 | 0.0196 | 0.0205 | 0.0001 | 0.0005 |
| 11 | 0.0202 | 0.02 | 0.02 | 0.0205 | 0.00005 | 0.0002 |
| 12 | 0.0203 | 0.0199 | 0.0199 | 0.0209 | 0.0002 | 0.00085 |
| 13 | 0.0204 | 0.0198 | 0.0198 | 0.0206 | 0.0005 | 0.0002 |
| 14 | 0.0203 | 0.0198 | 0.0197 | 0.02055 | 0.0008 | 0.0006 |
| 15 | 0.0203 | 0.0198 | 0.02 | 0.0206 | 0.0008 | 0.0011 |
| 16 | 0.0204 | 0.0198 | 0.0199 | 0.0206 | 0.00035 | 0.0008 |
| 17 | 0.0204 | 0.0198 | 0.0199 | 0.0197 | 0.0005 | 0.00095 |
| 18 | 0.0204 | 0.0199 | 0.0199 | 0.0207 | 0.00065 | 0.00085 |
| 19 | 0.0205 | 0.0198 | 0.0197 | 0.0202 | 0.0011 | 0.0005 |
| 20 | 0.0205 | 0.02 | 0.0198 | 0.0201 | 0.00145 | 0.0008 |
| 21 | 0.0207 | 0.0197 | 0.0196 | 0.0202 | 0.00105 | 0.0011 |
| 22 | 0.0204 | 0.0197 | 0.0197 | 0.0202 | 0.0011 | 0.001 |
| 23 | 0.0204 | 0.0197 | 0.0197 | 0.0201 | 0.0012 | 0.0005 |
| 24 | 0.0203 | 0.0198 | 0.0197 | 0.0203 | 0.0015 | 0.00075 |
| 25 | 0.0205 | 0.0198 | 0.0195 | 0.02 | 0.0009 | 0.00075 |
| 26 | 0.0196 | 0.0197 | 0.0197 | 0.0203 | 0.0001 | 0.00075 |
| 27 | 0.0207 | 0.0199 | 0.0197 | 0.02 | 0.001 | 0.0002 |
| 28 | 0.0204 | 0.0198 | 0.02 | 0.0206 | 0.0011 | 0.0005 |
| 29 | 0.0204 | 0.0198 | 0.02 | 0.0205 | 0.0011 | 0.0011 |
| 30 | 0.0203 | 0.0198 | 0.0198 | 0.0206 | 0.0011 | 0.001 |
| 31 | 0.0203 | 0.02 | 0.0198 | 0.0205 | 0.001 | 0.0011 |
| 32 | 0.0203 | 0.0198 | 0.0198 | 0.0206 | 0.001 | 0.00045 |
| 33 | 0.0204 | 0.0199 | 0.02 | 0.0207 | 0.0005 | 0.00105 |
| 34 | 0.0203 | 0.0198 | 0.0198 | 0.0205 | 0.0008 | 0.00095 |
| 35 | 0.0202 | 0.0199 | 0.02 | 0.0207 | 0.00095 | 0.001 |
| 36 | 0.0206 | 0.0198 | 0.0197 | 0.0207 | 0.001 | 0.0012 |
| 37 | 0.0205 | 0.0197 | 0.0197 | 0.0204 | 0.0015 | 0.00155 |
| 38 | 0.0203 | 0.0196 | 0.0195 | 0.0206 | 0.0015 | 0.00135 |
| 39 | 0.0204 | 0.0196 | 0.0197 | 0.0206 | 0.0011 | 0.00085 |
| 40 | 0.0206 | 0.0196 | 0.0196 | 0.0205 | 0.0009 | 0.00075 |
| 41 | 0.0204 | 0.0197 | 0.0197 | 0.0204 | 0.0007 | 0.001 |
| 42 | 0.0204 | 0.0197 | 0.0197 | 0.0207 | 0.00075 | 0.0015 |
| 43 | 0.0204 | 0.0197 | 0.0197 | 0.0207 | 0.0015 | 0.001 |
| 44 | 0.0205 | 0.0198 | 0.0197 | 0.0206 | 0.00095 | 0.00095 |
| 45 | 0.0206 | 0.0197 | 0.0196 | 0.0207 | 0.0012 | 0.0011 |
| 46 | 0.0204 | 0.0196 | 0.0194 | 0.0203 | 0.0012 | 0.00095 |
| 47 | 0.0203 | 0.0195 | 0.0195 | 0.0204 | 0.001 | 0.0012 |

TABLE 2-continued

Measurements for Sheet A (Inches)

|    | A       | B       | C       | D       | E       | F       |
|----|---------|---------|---------|---------|---------|---------|
| 48 | 0.0207  | 0.0195  | 0.0194  | 0.0206  | 0.0011  | 0.0012  |
| 49 | 0.0205  | 0.0195  | 0.0194  | 0.0202  | 0.0008  | 0.0011  |
| 50 | 0.0205  | 0.0196  | 0.0194  | 0.0202  | 0.0005  | 0.001   |
| 51 | 0.0204  | 0.0196  | 0.0195  | 0.0203  | 0.0015  | 0.0015  |
| 52 | 0.0204  | 0.0196  | 0.0195  | 0.0203  | 0.00055 | 0.00075 |
| 53 | 0.0204  | 0.0197  | 0.0197  | 0.0204  | 0.0012  | 0.0011  |
| 54 | 0.0206  | 0.0197  | 0.0195  | 0.0206  | 0.0012  | 0.00135 |
| 55 | 0.0206  | 0.0197  | 0.0197  | 0.0205  | 0.001   | 0.0011  |
| 56 | 0.0205  | 0.0196  | 0.0196  | 0.0204  | 0.0011  | 0.00095 |
| 57 | 0.0205  | 0.0197  | 0.0196  | 0.0204  | 0.00155 | 0.00155 |
| 58 | 0.0205  | 0.0198  | 0.0197  | 0.0204  | 0.0011  | 0.00075 |
| 59 | 0.0205  | 0.0197  | 0.0196  | 0.0204  | 0.0009  | 0.0015  |
| 60 | 0.0205  | 0.0197  | 0.0197  | 0.0205  | 0.00095 | 0.0011  |
| 61 | 0.0206  | 0.0198  | 0.0198  | 0.0206  | 0.0008  | 0.0015  |
| 62 | 0.0207  | 0.02    | 0.0198  | 0.0205  | 0.00115 | 0.0005  |
| 63 | 0.021   | 0.0198  | 0.02    | 0.0205  | 0.0011  | 0.0011  |
| Sample mean (sheet A): | 0.0205 | 0.01975 | 0.01972 | 0.02041 | 0.00088 | 0.00085 |

TABLE 3

Measurements for Sheet B (Inches)

|    | A       | B       | C       | D       | E       | F       |
|----|---------|---------|---------|---------|---------|---------|
| 1  | 0.0208  | 0.0197  | 0.0196  | 0.0202  | 0.0015  | 0.0003  |
| 2  | 0.0205  | 0.0197  | 0.0197  | 0.0202  | 0.0005  | 0.00015 |
| 3  | 0.0204  | 0.0196  | 0.0195  | 0.0203  | 0.0005  | 0.001   |
| 4  | 0.0207  | 0.0196  | 0.0197  | 0.0205  | 0.00085 | 0.00065 |
| 5  | 0.0208  | 0.0196  | 0.0197  | 0.0205  | 0.0006  | 0.0009  |
| 6  | 0.0206  | 0.0196  | 0.0197  | 0.0204  | 0.0011  | 0.0009  |
| 7  | 0.0205  | 0.0197  | 0.0197  | 0.0203  | 0.00085 | 0.00055 |
| 8  | 0.0205  | 0.0196  | 0.0196  | 0.0202  | 0.00075 | 0.0005  |
| 9  | 0.0205  | 0.0196  | 0.0195  | 0.0202  | 0.0015  | 0.0015  |
| 10 | 0.0202  | 0.0197  | 0.0198  | 0.02055 | 0.001   | 0.0011  |
| 11 | 0.0201  | 0.0196  | 0.0196  | 0.02055 | 0.00075 | 0.0016  |
| 12 | 0.0202  | 0.0198  | 0.0197  | 0.0206  | 0.001   | 0.00155 |
| 13 | 0.0204  | 0.02    | 0.0198  | 0.0208  | 0.0011  | 0.001   |
| 14 | 0.0202  | 0.0197  | 0.0198  | 0.0207  | 0.0011  | 0.0011  |
| 15 | 0.02025 | 0.0197  | 0.0197  | 0.0206  | 0.00065 | 0.0011  |
| 16 | 0.0202  | 0.01975 | 0.02    | 0.0207  | 0.00085 | 0.00175 |
| 17 | 0.0202  | 0.0197  | 0.01975 | 0.0209  | 0.0004  | 0.0015  |
| 18 | 0.0203  | 0.0197  | 0.0197  | 0.0206  | 0.0011  | 0.0011  |
| 19 | 0.02045 | 0.0197  | 0.0197  | 0.0199  | 0.00145 | 0.0006  |
| 20 | 0.0204  | 0.0197  | 0.0196  | 0.0201  | 0.0012  | 0.0011  |
| 21 | 0.0204  | 0.0198  | 0.0198  | 0.0205  | 0.0009  | 0.0009  |
| 22 | 0.0205  | 0.0197  | 0.0197  | 0.0205  | 0.0007  | 0.0008  |
| 23 | 0.0205  | 0.0197  | 0.01965 | 0.0202  | 0.0012  | 0.0008  |
| 24 | 0.0205  | 0.0195  | 0.0196  | 0.0205  | 0.00135 | 0.0009  |
| 25 | 0.0205  | 0.0197  | 0.0197  | 0.0204  | 0.0011  | 0.00065 |
| 26 | 0.0205  | 0.01965 | 0.01975 | 0.0201  | 0.00175 | 0.0002  |
| 27 | 0.0206  | 0.0197  | 0.0197  | 0.0201  | 0.001   | 0.0011  |
| 28 | 0.0201  | 0.0196  | 0.0197  | 0.0205  | 0.0011  | 0.0011  |
| 29 | 0.0202  | 0.0195  | 0.0196  | 0.0204  | 0.00065 | 0.001   |
| 30 | 0.0204  | 0.0197  | 0.01975 | 0.0206  | 0.0011  | 0.0015  |
| 31 | 0.0203  | 0.0198  | 0.0198  | 0.0207  | 0.00035 | 0.00135 |
| 32 | 0.0202  | 0.0197  | 0.0197  | 0.0205  | 0.0009  | 0.0008  |
| 33 | 0.0202  | 0.01955 | 0.0196  | 0.0206  | 0.0006  | 0.0012  |
| 34 | 0.0202  | 0.0197  | 0.0197  | 0.0206  | 0.0011  | 0.0011  |
| 35 | 0.0203  | 0.0198  | 0.0198  | 0.0207  | 0.0005  | 0.001   |
| 36 | 0.0203  | 0.0196  | 0.0196  | 0.0206  | 0.0005  | 0.0011  |
| 37 | 0.0203  | 0.0195  | 0.0195  | 0.0206  | 0.001   | 0.0011  |
| 38 | 0.0203  | 0.0195  | 0.0195  | 0.0206  | 0.0008  | 0.0014  |
| 39 | 0.0204  | 0.0196  | 0.0196  | 0.0207  | 0.00075 | 0.0014  |
| 40 | 0.0203  | 0.0195  | 0.0197  | 0.0207  | 0.0006  | 0.0015  |
| 41 | 0.0203  | 0.01945 | 0.01945 | 0.0206  | 0.001   | 0.0011  |
| 42 | 0.0202  | 0.0194  | 0.0195  | 0.0207  | 0.0015  | 0.00155 |
| 43 | 0.0205  | 0.0194  | 0.0195  | 0.0207  | 0.0011  | 0.00085 |
| 44 | 0.0204  | 0.0195  | 0.0195  | 0.0206  | 0.0011  | 0.0015  |
| 45 | 0.0204  | 0.0195  | 0.0195  | 0.0207  | 0.00075 | 0.0011  |
| 46 | 0.0203  | 0.0194  | 0.0193  | 0.02025 | 0.00085 | 0.0012  |
| 47 | 0.0204  | 0.0194  | 0.0193  | 0.0204  | 0.00145 | 0.00085 |
| 48 | 0.0205  | 0.01945 | 0.0194  | 0.0205  | 0.001   | 0.001   |
| 49 | 0.0205  | 0.0195  | 0.0194  | 0.0205  | 0.001   | 0.001   |
| 50 | 0.0203  | 0.0193  | 0.0193  | 0.0203  | 0.00145 | 0.00075 |
| 51 | 0.0203  | 0.0194  | 0.0193  | 0.0203  | 0.001   | 0.0012  |
| 52 | 0.0204  | 0.0194  | 0.0194  | 0.0203  | 0.0008  | 0.0015  |
| 53 | 0.0204  | 0.0195  | 0.0194  | 0.0202  | 0.00035 | 0.00155 |
| 54 | 0.0205  | 0.0194  | 0.0194  | 0.0203  | 0.00135 | 0.0012  |
| 55 | 0.02075 | 0.01965 | 0.01965 | 0.02045 | 0.00155 | 0.0005  |
| 56 | 0.0205  | 0.0195  | 0.01955 | 0.02045 | 0.00085 | 0.0005  |
| 57 | 0.0206  | 0.0194  | 0.0196  | 0.0205  | 0.001   | 0.0011  |
| 58 | 0.0208  | 0.0197  | 0.0196  | 0.0206  | 0.00095 | 0.0012  |
| 59 | 0.02075 | 0.0194  | 0.0195  | 0.0204  | 0.0016  | 0.0011  |
| 60 | 0.0207  | 0.0194  | 0.0195  | 0.0204  | 0.0012  | 0.001   |
| 61 | 0.0206  | 0.0197  | 0.0196  | 0.0206  | 0.001   | 0.0015  |
| 62 | 0.0205  | 0.0196  | 0.0196  | 0.0206  | 0.0008  | 0.0005  |
| 63 | 0.02065 | 0.0195  | 0.0195  | 0.0204  | 0.0005  | 0.00095 |
| Sample mean (sheet B): | 0.0204 | 0.0196 | 0.0196 | 0.0205 | 0.0010 | 0.0010 |

The invention may be embodied in other specific forms without departing from the essential attributes thereof; therefore, the illustrated embodiments should be considered in all respects as illustrative and not restrictive.

What is claimed is:

1. A lens sheet presenting a first surface and a second surface spaced from the first surface by a distance defining a lens sheet thickness, the lens sheet comprising:
    a first lens array formed in the first surface, the first lens array including a first plurality of lenses, wherein each lens of the first plurality of lenses has a first lens height measured as a distance extending from a lens base to a lens peak, a first lens density, a first lens direction, and a first lens focal length;
    a second lens array formed in the first surface, the second lens array including a second plurality of lenses, wherein each lens of the second plurality of lenses has a second lens height measured as a distance extending from a lens base to a lens peak, a second lens density, a second lens direction, and a second lens focal length,
    wherein at least one of the second lens height, second lens density, second lens direction, and second lens focal length is different than the first lens height, first lens density, first lens direction, and first lens focal length; and
    at least one planar portion defined on the first surface, wherein the first and second lens heights are equal to or less than the lens sheet thickness, wherein the lens peak of the first and second lens arrays is flush with or below the at least one planar portion, and wherein at least one of the first and second lens arrays is entirely bordered by the at least one planar portion.

2. The lens sheet of claim 1, further comprising an image layer applied to the second surface, wherein the image layer is viewable through the first surface.

3. The lens sheet of claim 2, wherein the image layer is printed directly on the second surface.

4. The lens sheet of claim 2, wherein the image layer is printed on a separate substrate bonded to the second surface of the lens sheet.

5. The lens sheet of claim 2, wherein the image layer is applied below the first lens array such that the image layer is viewable through the first lens array.

6. The lens sheet of claim 2, wherein the image layer is applied to the second surface below the at least one planar portion of the first surface such that the image layer is viewable through the at least one planar portion.

7. The lens sheet of claim 1, further comprising an image layer applied to the at least one planar portion of the first surface.

\* \* \* \* \*